(12) United States Patent
Kim et al.

(10) Patent No.: US 7,766,391 B2
(45) Date of Patent: Aug. 3, 2010

(54) PIPE CONNECTING STRUCTURE

(75) Inventors: Jong Chul Kim, Chungcheongnam-do (KR); Jung Uk Hwang, Chungcheongnam-do (KR); Hong Yeol Lee, Chungheongnam-do (KR); Ki Chun Sung, Chungcheongnam-do (KR)

(73) Assignee: Doowon Climate Control Co., Ltd., Chungcheongnam-do (KR)

( * ) Notice: Subject to any disclaimer, the term of this patent is extended or adjusted under 35 U.S.C. 154(b) by 706 days.

(21) Appl. No.: 11/730,494

(22) Filed: Apr. 2, 2007

(65) Prior Publication Data
US 2007/0236008 A1 Oct. 11, 2007

(30) Foreign Application Priority Data
Apr. 5, 2006 (KR) ............... 10-2006-0030917
Apr. 20, 2006 (KR) ............... 10-2006-0035546
Jun. 21, 2006 (KR) ............... 10-2006-0056003

(51) Int. Cl.
*F16L 21/02* (2006.01)

(52) U.S. Cl. ............... 285/205; 285/208; 285/374; 285/379

(58) Field of Classification Search ............ 285/139.1, 285/208, 205, 374, 403, 207, 206, 368, 379, 285/124.4
See application file for complete search history.

(56) References Cited

U.S. PATENT DOCUMENTS

| | | | |
|---|---|---|---|
| 2,191,044 A | 2/1940 | Seligman | |
| 3,524,662 A | 8/1970 | Tolman, et al. | |
| 4,089,549 A * | 5/1978 | Vyse et al. | 285/124.4 |
| 4,116,476 A * | 9/1978 | Porter et al. | 285/124.4 |
| 4,195,855 A | 4/1980 | van Haren et al. | |
| 4,258,939 A * | 3/1981 | Karlen | 285/124.4 |
| 4,278,275 A * | 7/1981 | Diederich, Jr. | 285/12 |
| 4,345,786 A * | 8/1982 | Egert | 285/124.4 |
| 4,382,618 A * | 5/1983 | Grisebach | 285/124.4 |
| 4,382,619 A * | 5/1983 | Grisebach | 285/124.4 |
| 4,478,436 A * | 10/1984 | Hashimoto | 285/124.4 |

(Continued)

FOREIGN PATENT DOCUMENTS

DE 103 03 350 B3 8/2004

(Continued)

*Primary Examiner*—David E Bochna
(74) *Attorney, Agent, or Firm*—Dickstein Shapiro LLP

(57) ABSTRACT

A pipe connecting structure including a male flange block combined with a first pipe and a female flange block combined with a second pipe, which is fastened to the male flange block by a fastener, where a protrusion having a hole that communicates with the first pipe is formed through the male flange block, and an insert portion into which the protrusion is inserted is formed through the female flange block, and a sealing member to closely contact with the end face of the protrusion is seated on the bottom inside the insert portion, and the sealing member includes an inner sealing part of soft metal and an outer sealing part of rubber tightly fitted around the outer circumference of the inner sealing part. Therefore joints between pipes, a heat exchanger and a pipe, or two components can bear high pressures in a refrigerating cycle system using a $CO_2$ refrigerant, air tightness can be maintained under low and high temperatures without changes in quality and shape of a sealing members, and it is possible to prevent and minimize leakage of the refrigerant by preventing permeation of $CO_2$.

17 Claims, 23 Drawing Sheets

U.S. PATENT DOCUMENTS

| | | |
|---|---|---|
| 5,308,125 A | 5/1994 | Anderson, Jr. |
| 5,354,101 A | 10/1994 | Anderson, Jr. |
| 6,318,768 B1 | 11/2001 | Gehres |
| 6,386,593 B1 | 5/2002 | Slais et al. |
| 2003/0080554 A1 | 5/2003 | Schroeder et al. |
| 2004/0089455 A1 | 5/2004 | Richardson |
| 2004/0178631 A1 | 9/2004 | Frohling et al. |

FOREIGN PATENT DOCUMENTS

| | | |
|---|---|---|
| EP | 0 736 717 A1 | 10/1996 |
| KR | 10-0692992 B1 | 3/2007 |
| KR | 10-0704645 B1 | 4/2007 |

* cited by examiner (a)

(b)

(a)    (b)

US 7,766,391 B2

PIPE CONNECTING STRUCTURE

BACKGROUND OF THE INVENTION

1. Field of the Invention

The present invention relates to a pipe connecting structure, particularly a pipe connecting structure that connects two pipes with improved air tightness.

2. Description of the Related Art

In general, two pipes in refrigerating cycle systems for a vehicle are connected by flange blocks as shown in FIG. 1.

In detail, a flange connecting structure has a male flange block 4 of a peanut shaped cross section combined with a first pipe 2 and a female flange block 8 of a peanut shaped cross section combined with a second pipe 6 that are fastened by a bolt 10. The male flange block 4 has a protrusion 4a having a hole communicating with the first pipe 2 and the female flange block 8 has an insert portion 8a to which the protrusion 4a is inserted. A rubber sealing member 12 (O-ring) is fitted around the protrusion 4a for sealing. The bolt 10 is fixedly inserted in a hole 8b of the female flange block 8 through a through hole 4b of the male flange block 4.

In recent years, refrigerating cycle systems using an environmentally friendly natural refrigerant of Carbon dioxide ($CO_2$) have increased because Freon gas causes environmental pollution.

A refrigerating cycle using $CO_2$ refrigerant as a heat exchange medium is a supercritical refrigerating cycle with internal pressure exceeding a critical pressure, so that the internal pressure is a lot larger (generally, about 7 to 9 times) than refrigerating cycle systems, in the related art, using a Freon-series refrigerant. The internal temperature of the system ranges from −40° C. to 180° C.

Rubber sealing members (O-ring) used in pipe flanges of the refrigerating cycle system for vehicles in the related art cannot bear the high pressure in the refrigerating cycle system using $CO_2$ refrigerant. Sealing members of ethylene-based (ACM) rubber is relatively high in density, so that they are short in elasticity at a cold region under extremely low temperature. Therefore, when the sealing members receive an outer shock, they cannot sufficiently absorb the shock, so that they are distorted or gaps are created, and thus, the refrigerant correspondingly leaks out. Further, as for sealing members of propylene-based (EPDM) rubber, permeation is caused by $CO_2$ refrigerant's characteristics, so that the refrigerant leaks out regardless of the environments.

The present invention is designed to overcome the above problems, it is an object of the invention to provide a pipe connecting structure that bears high pressure, keeps air tightness without changes in quality or deformation of a sealing member at low and high temperatures, and prevents leakage of a refrigerant by preventing permeation of $CO_2$ in a refrigerating cycle system using $CO_2$ refrigerant.

SUMMARY OF THE INVENTION

A pipe connecting structure for a refrigerating cycle system for a vehicle according to an embodiment of the invention includes a male flange block combined with a first pipe and a female flange block combined with a second pipe, which is fastened to the male flange block by fastening means, in which a protrusion having a hole that communicates with the first pipe is formed through the male flange block, and an insert portion into which the protrusion is inserted is formed through the female flange block, and a sealing member to get a close contact with the end face of the protrusion is seated on the bottom inside the insert portion, and the sealing member includes an inner sealing part of soft metal and an outer sealing part of rubber tightly fitted around the outer circumference of the inner sealing part.

The male flange block includes a protrusion with a hole that communicates with the first pipe, the female flange block has an insert portion into which the protrusion is inserted, and the sealing member is fitted around the outside of the protrusion, and the sealing member includes an outer sealing part of soft metal and an inner sealing part of rubber closely contacting the inside of the outer sealing part.

The male flange block includes a protrusion with a hole that communicates with the first pipe, the female flange block has an insert portion into which the protrusion is inserted, and the sealing member is fitted around the outside of the protrusion. Further, a receiving groove to receive the sealing member is formed around the root end of the protrusion, the sealing member includes an inner sealing part of soft metal and an outer sealing part of rubber closely contacting the outer circumference of the inner sealing part, and a circumferential prominence to press the inner sealing part is formed around the edge of the entrance of the insert portion of the female flange block.

The male flange block includes a protrusion with a hole that communicates with the first pipe, the female flange block has an insert portion into which the protrusion is inserted, and the sealing member is fitted around the outside of the protrusion. A step to receive and seat the sealing member is formed on an outer circumference of the end of the protrusion, and the sealing member includes an inner sealing part of soft metal and an outer sealing part of rubber entirely wrapping around the outside of the inner sealing part.

A pipe connecting structure for a refrigerating cycle system according to an embodiment of the invention includes first and second pipes that are connected and arranged to allow a refrigerant to circulate in the refrigerating cycle, and connecting means that connects the first pipes to a second pipe. The connecting means includes: a male flange block that includes a first pipe-combining hole to fit the first pipe; a first combining protrusion that protrudes from a surface of the male flange block in communication with the first pipe-combining hole; a second combining protrusion that protrudes from the end face of the first combining protrusion and has a first seating face inside the second combining protrusion; a sealing member that is fitted around the outside of the second combining protrusion and seated in the first seating face inside the second combining protrusion; a female flange block that has a second pipe-combining hole bored from one side to insert the second pipe, a first protrusion-combining hole bored from the other side in communication with the second pipe-combining hole to insert the first combining protrusion, a second protrusion-combining groove formed around the edge inside the first protrusion-combining hole to insert the second combining protrusion, and a second seating face formed inside along the second protrusion-combining groove to seat a side of the sealing member; and fastening means that fastens the male flange block and the female flange block.

In other words, the male flange block and the female flange block are combined by inserting the first and second combining protrusions, in the first protrusion-combining hole and the second protrusion-combining hole, respectively, and the hardness is increased at the joints accordingly. Further, the sealing member is fitted around the second combining protrusion and provides double sealing inside and outside the first and second pipe-combining holes. Therefore, the air tightness is increased at the joints after assembling.

A pipe connecting structure for an air conditioner for a vehicle according to another embodiment of the invention includes a male flange block combined with a first pipe and a female flange block combined with a second pipe, which is fastened to the male flange block by a bolt. The male flange block has a protrusion that communicates with the first pipe and the female flange block has an insert portion into which the protrusion is inserted. A primary sealer is provided at the middle of the protrusion for primary sealing and a secondary sealer is provided at the root end of the protrusion for secondary sealing. A fixing pin is inserted into the male flange block and the female flange block so that the protrusion is accurately inserted into the insert portion and provides convenience in working.

The primary sealer is a rubber ring and the secondary sealer is a ring including a metal sealing part and a rubber sealing part combined with the metal sealing part.

The protruding length of the protrusion of the male flange block ranges from 12 to 18 mm and the thickness of the male flange block and the bolt-fastening length (the distance between the centers of the protrusion and the bolt) ranges from 14 to 16 mm.

The fastening torque for the male flange block and the female flange block ranges from 10 to 14 Nm.

BRIEF DESCRIPTION OF THE DRAWINGS

The above and other features and advantages of the present invention will become more apparent by describing in detail preferred embodiments thereof with reference to the attached drawings in which.

DESCRIPTION OF THE PREFERRED EMBODIMENTS

Hereinafter, a detailed description will be given of the present invention.

Figure 1:
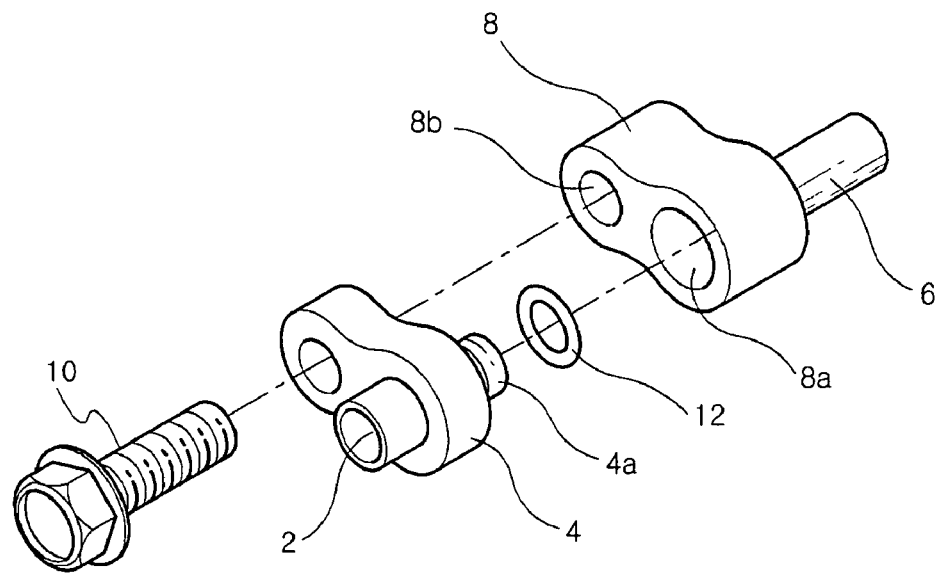
FIG. 1 is a perspective exploded view of a pipe connecting structure for a refrigerating cycle system in the related art.
Figure 2:
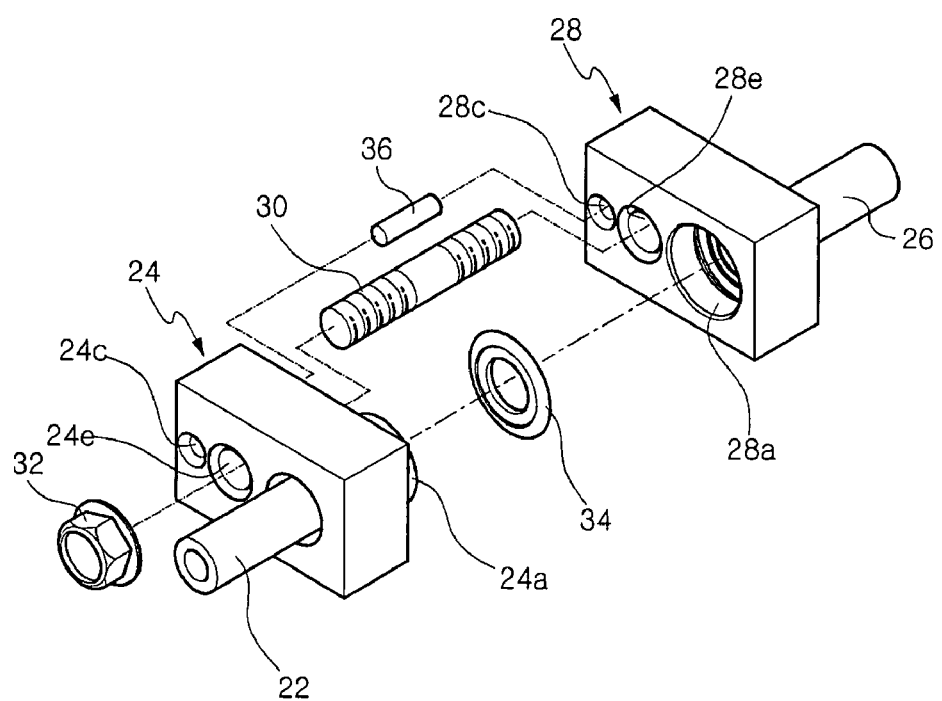
FIG. 2 is a perspective exploded view of a pipe connecting structure for a refrigerating cycle system according to a first embodiment of the invention.
Figure 3:
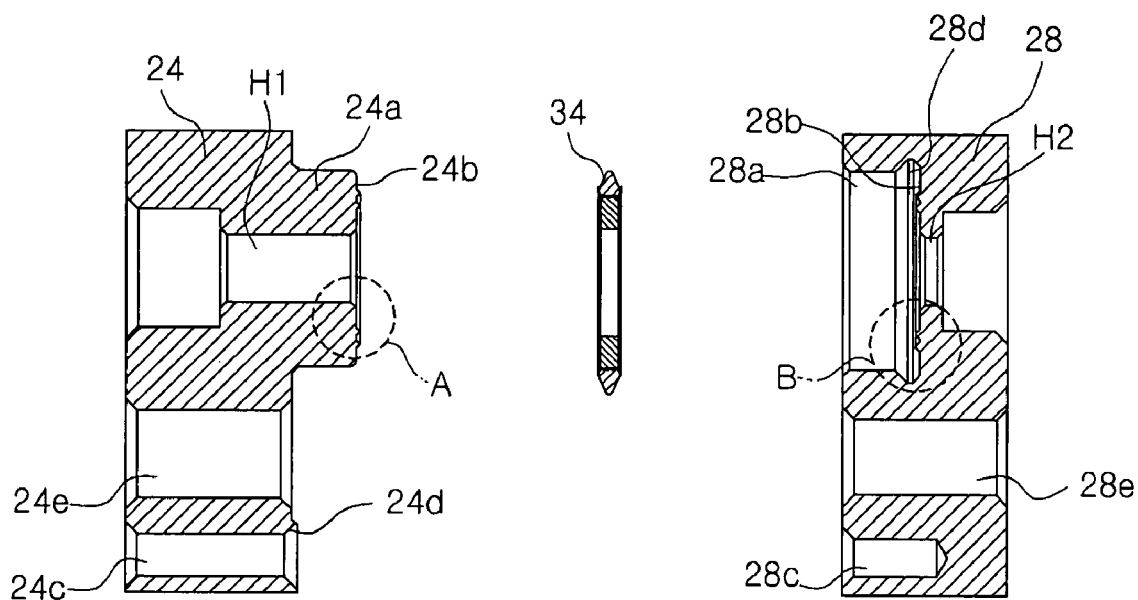
FIG. 3 is a detailed cross-sectional view for the male flange block, female flange block, and sealing member of FIG. 2.
Figure 4:
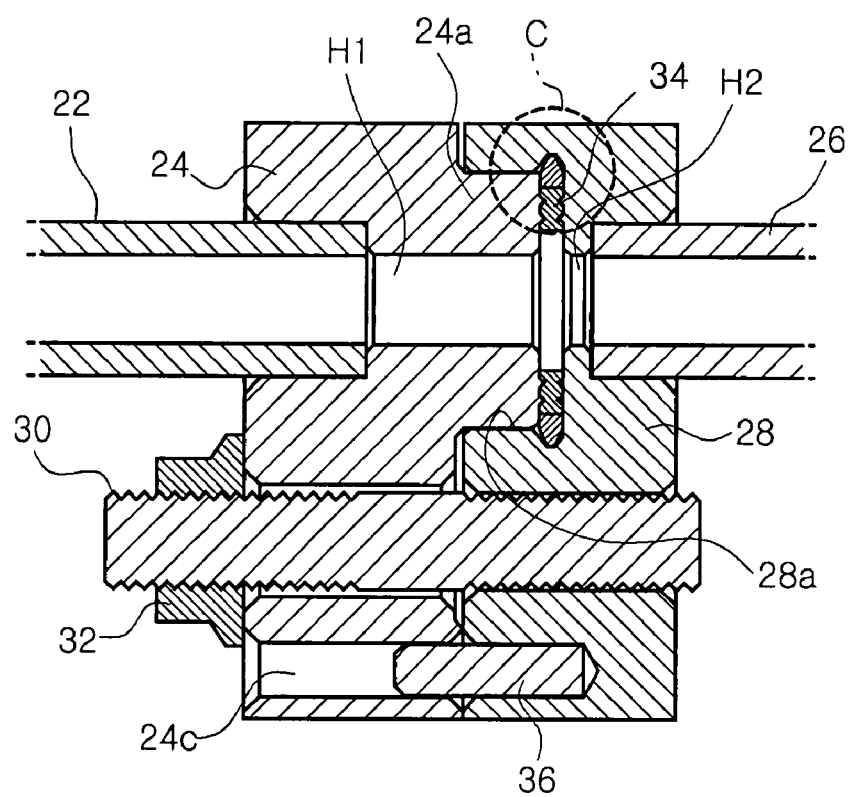
FIG. 4 is an assembly view illustrating the connecting structure of the pipe flanges for refrigerating cycle system according to a first embodiment of the invention.

FIGS. 2 to 4 show a pipe connecting structure according to a first embodiment of the invention. As shown in the figures, the pipe connecting structure is assembled by fastening a rectangular shaped male flange block 24 combined with a first pipe 22 and a rectangular shaped female flange block 28 combined with a second pipe 26, with fastening means of a stud bolt 30 and a nut 32.

The male flange block 24 has a protrusion 24a having a hole H1 that communicates with the first pipe 22 and the female flange block 28 has an insert portion 28a to which the protrusion 24a is inserted. A sealing member 34 to get a closecontact with the end face 24b of the protrusion 24a is seated on the bottom 28b inside the insert portion 28a. A fixing pin 36 is inserted into the male and female flange blocks 24, 28 so that the protrusion 24a is accurately inserted into the insert portion 28a. The second pipe 26 communicates with a hole H2 in the insert portion 28a.

The stud bolt 30 passes via a through hole 24e of the male flange block 24 and a through hole 28e of the female flange block 28 and fixed by the nut 32. A nut at the opposite side is not shown in the present embodiment.

Holes 24c, 28c to which the fixing pin 36 is inserted are formed through the male flange block 24 and the female flange block 28, respectively. The hole 24c is a through hole and the hole 28c is closed at one side.

Figure 5:
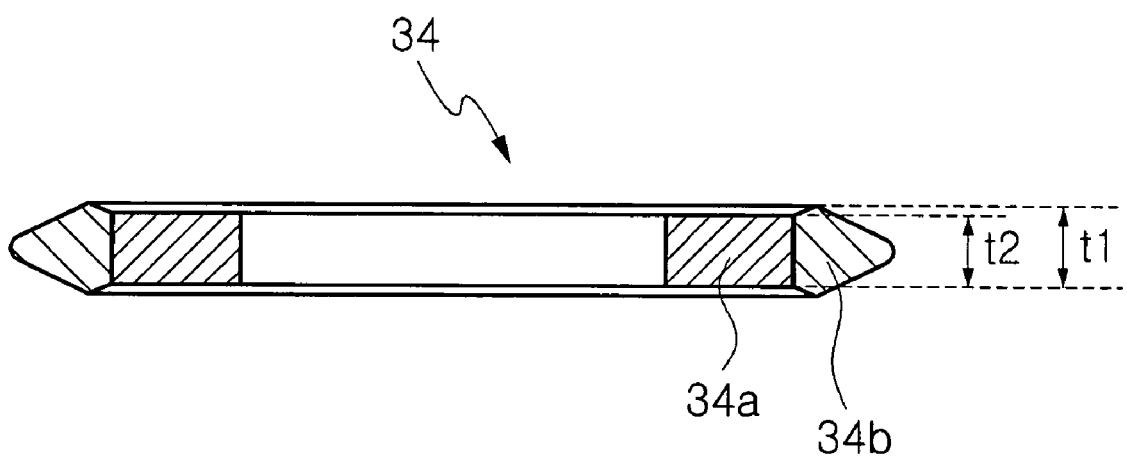
FIG. 5 is a detailed cross-sectional view of the sealing member of FIG. 3.

As shown in FIG. 5, the sealing member 34 is an integral unit formed by closely combining an inner sealing part 34a of soft metal with an outer sealing part 34b of rubber around the outer circumference of the inner sealing part 34a. The inner sealing part 34a is made of soft metal, such as aluminum, white wax, or tin alloy, and the outer sealing part 34b is made of propylene-based or nitrol-based rubber with high elasticity and air tightness. The outer sealing part 34b has a diamond-shape cross section with one corner cut and the outer sealing part 34b is adhered to the inner sealing part 34a by a bond to reinforce the combination.

The outer sealing part 34b has a larger thickness t1 in the range of 1.2 to 2 times larger than a thickness t2 of the inner sealing part 34a to allow the sealing member 34 to keep air tightness as it is pressed by the bottom 28b of the insert portion 28a and the end face 24b of the protrusion 24a.

Figure 6:
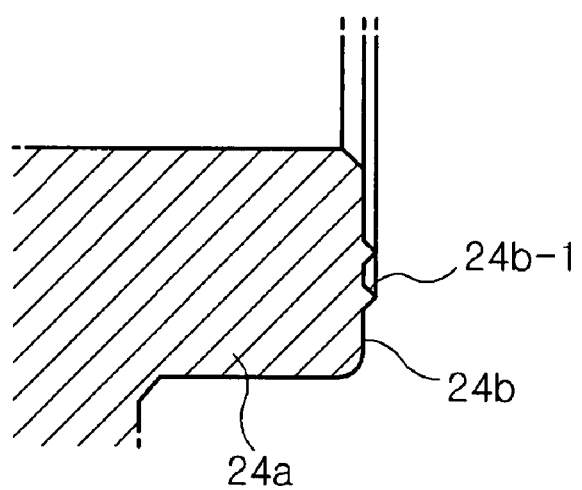
FIG. 6 is a detailed view of the part represented by A of FIG. 5.
Figure 7:
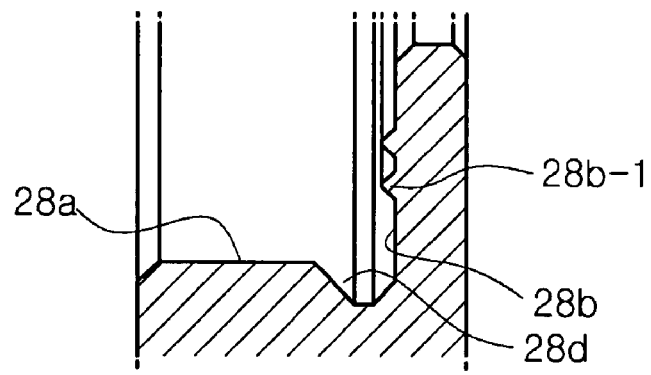
FIG. 7 is a detailed view of the part represented by B of FIG. 5.

As shown in FIGS. 6 and 7, beads 24b-1, 28b-1 having a triangular cross section are circumferentially formed on the end face 24b of the protrusion 24a and the bottom 28b of the insert portion 28a to keep air tightness by pressing the inner sealing part 34a. The beads 24b-1, 28b-1 may have a circular or polygonal cross section.

A seating groove 28d is circumferentially formed along the edge of the bottom inside the insert portion 28a to which the outer sealing part 34b insertedly mounted.

Figure 8:
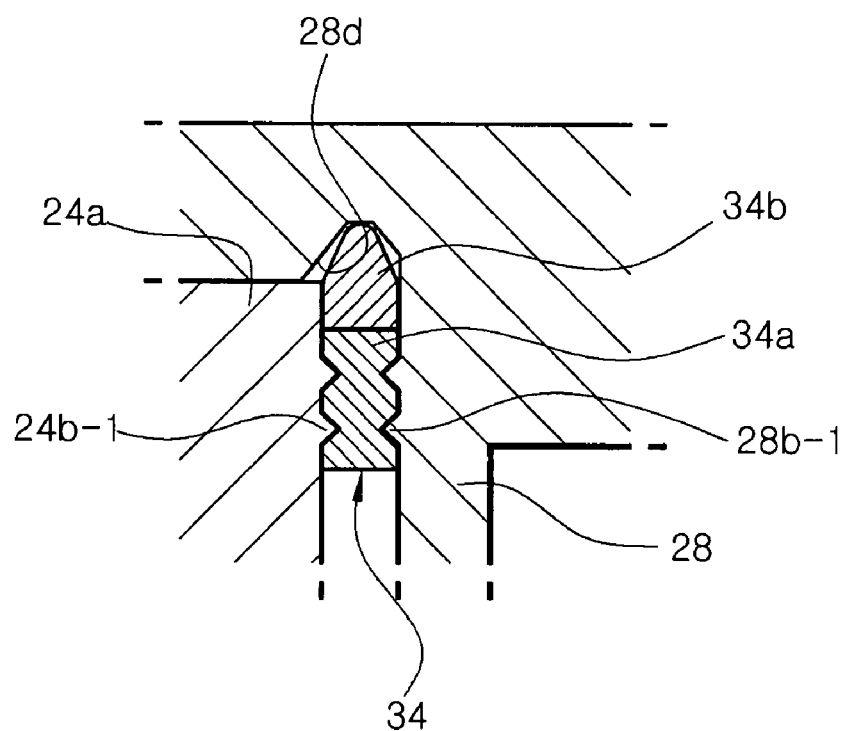
FIG. 8 is a detailed view of the part represented by C of FIG. 4.

FIG. 8 illustrates the keeping of air tightness by pressing the outer sealing part 34b of the sealing member 34 with the bottom 28d of the insert portion 28a and the end face 24b of the protrusion 24a, and by pressing the inner sealing part 34a of the sealing member 34 with the beads 24b-1, 28b-1.

As shown in FIG. 3, in the male flange block, a step 24d is formed at one side (which is toward the hole 28c of the female flange block 28) of the hole 24c to which the fixing pin is inserted to uniformly distribute fastening force to the sealing member 34 that is pressed when the male and female flange blocks 24, 28 are fastened by the bolt. The step 24d has a height equal to or smaller than the thickness of the inner sealing part 34a of the sealing member 34.

Figure 9:
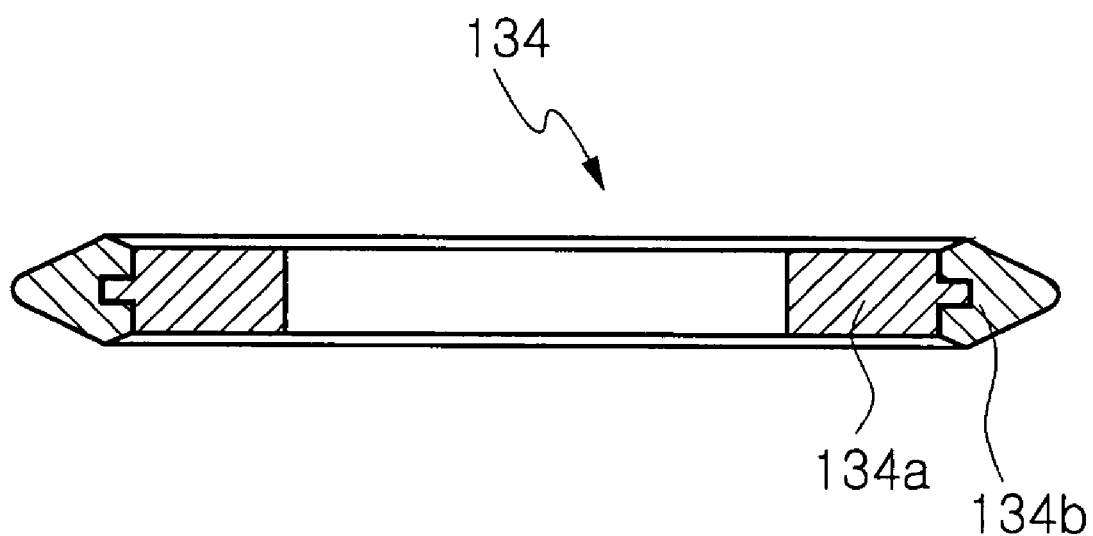
FIGS. 9A and B are detailed cross-sectional view of modifications for the sealing member of FIG. 3.
Figure 9:
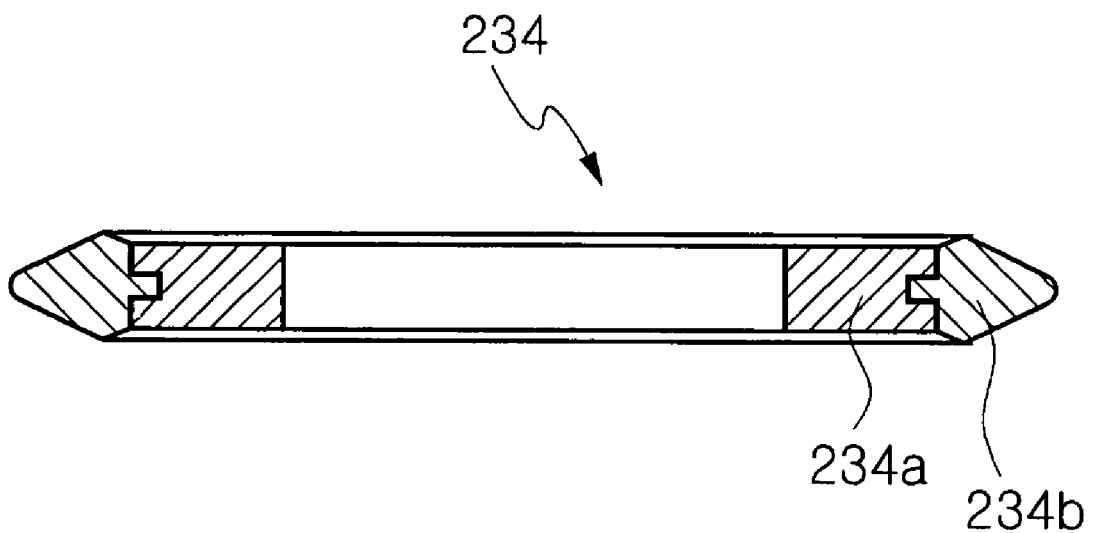

FIGS. 9A and 9B show modifications for the sealing member shown in FIG. 5. As for sealing members 134, 234 according to the present modification, a prominence and a depression to fit each other are formed on the combining surfaces of inner sealing parts 134a, 234a of soft metal and outer sealing parts 134b, 234b of rubber to increase the combining force. The other configurations are the same as the sealing member 34 of FIG. 5.

Figure 10:
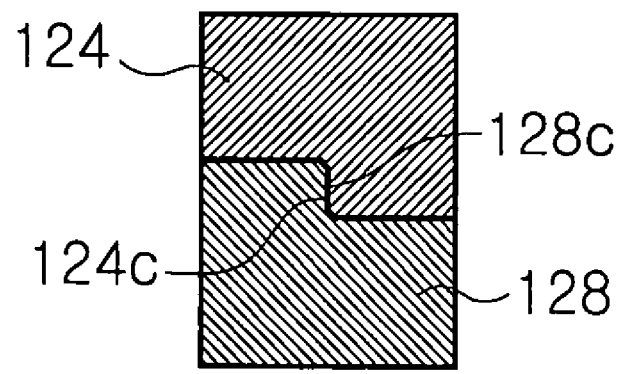
FIG. 10 is a detailed cross-sectional view of a step and a counter step that serve as the fixing pin shown in FIG. 4.

Referring to FIG. 10, instead of the fixing pin of FIG. 4, a step 124c is formed at the male flange block 124 and a counter step 128c that is fitted to the step 124c is formed at the female flange block 128. The steps 124c, 128c allow accurate assembly of the male flange block 124 and the female flange block 128.

Figure 11:
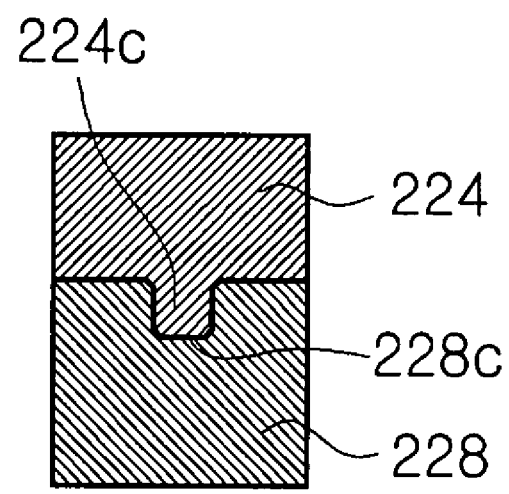
FIG. 11 is a detailed cross-sectional view of a prominence and a counter depression that serve as the fixing pin shown in FIG. 4.

Referring to FIG. 11, instead of the fixing pin of FIG. 4, a prominence 224c is formed at the male flange block 224 and a counter depression 228c that is fitted to the prominence 224c is formed at the female flange block 228. The prominence 224c and counter depression 228c allow accurate assembly of the male flange block 224 and the female flange block 228.

Figure 12:
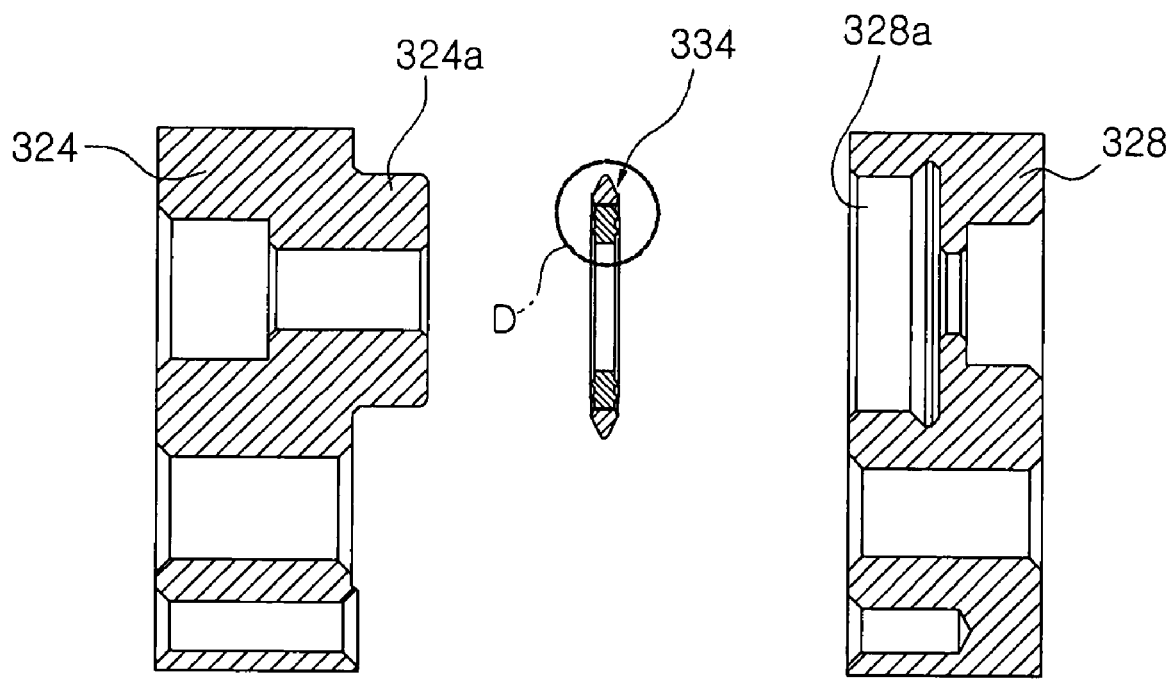
FIG. 12 is a cross-sectional view showing a sealing member with beads instead of the beads formed on the male flange block and the female flange block of FIG. 3.
Figure 13:
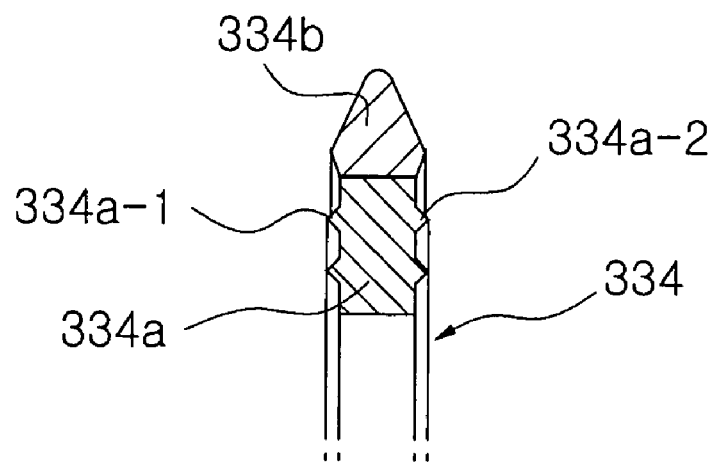
FIG. 13 is a detailed view of the part represented by D of FIG. 12.

Referring to FIGS. 12 and 13, instead of forming the beads on the male and female flange blocks as shown in FIG. 3, beads are formed at a sealing member. As shown in the figures, in a sealing member 334 including an inner sealing member 334a of soft metal and an outer sealing member 334b of rubber, beads 334a-1, 334a-2 that are pressed by the end face of a protrusion 324a and the bottom of an insert portion 328a are formed on both sides of the inner sealing part 334a to keep air tightness.

Figure 14:
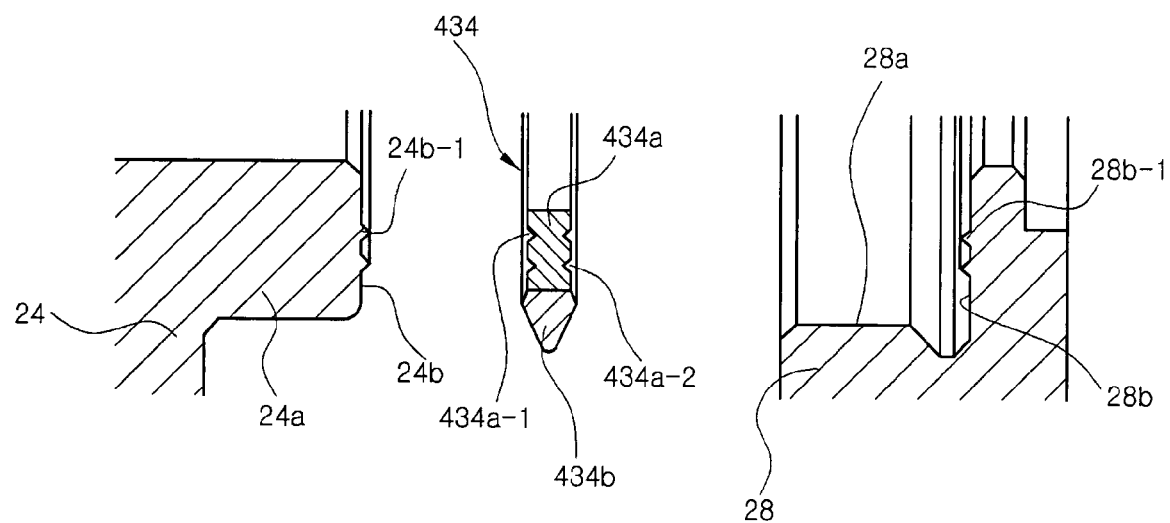
FIG. 14 is a cross-sectional view showing a sealing member with engraved beads to which the beads formed on the male flange block and the female flange block are inserted.

Referring to FIG. 14, engraved beads to fit the beads formed on the male and female flange blocks of FIG. 3 are formed on a sealing member. As shown in FIG. 14, in a sealing member 434 including an inner sealing part 434a of soft metal and an outer sealing part 434b of rubber, engraved beads 434a-1, 434a-2 are formed on both sides of the inner sealing part 434a to fit the beads 24b-1 formed on the end face 24b of the protrusion 24a and to fit the beads 28b-1 formed on the bottom 28b of the insert portion 28a. Air tightness is kept by closely fitting the beads 24b-1, 28b-1 in the engraved beads 434a-1, 434a-2.

Figure 15:
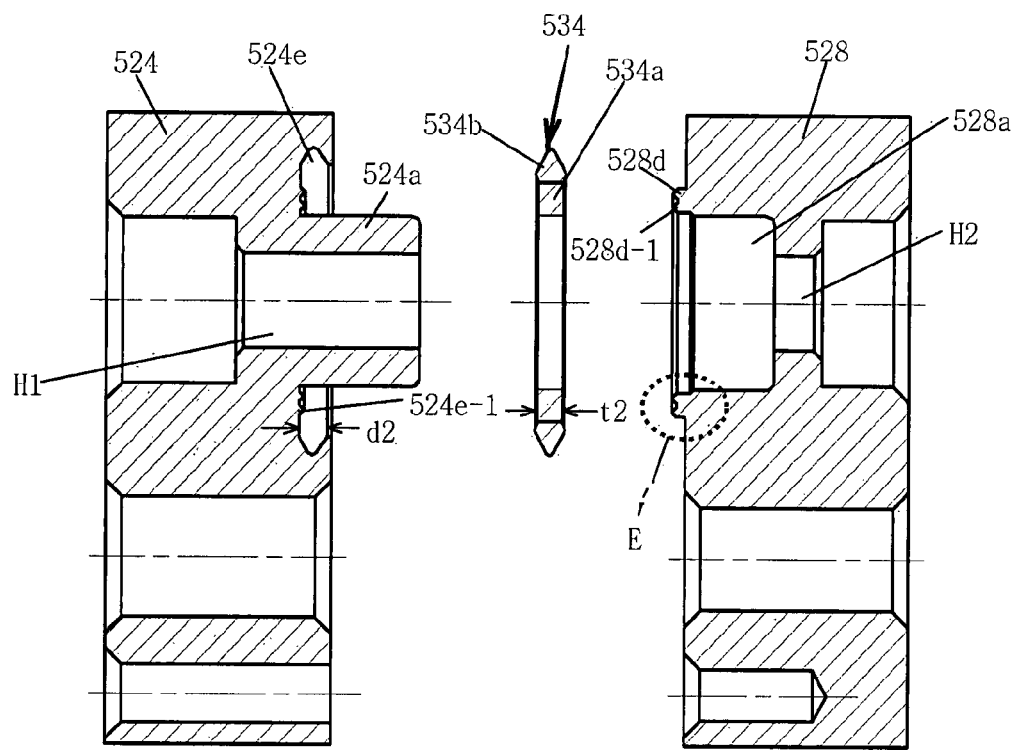
FIG. 15 is a cross-sectional view of a pipe connecting structure for a refrigerating cycle system according to a second embodiment of the invention.

FIG. 15 shows a pipe connecting structure according to a second embodiment on the invention. As shown in FIG. 15, a male flange block 524 has a protrusion 524a with a hole H1 communicating with the first pipe (shown in FIG. 4), a female flange block 528 has a insert portion 528a to which the protrusion 524a is inserted, and a sealing member 534 is fitted around the outside of the protrusion 524a. A receiving groove 524e to receive the sealing member 534 is formed around the root end of the protrusion 524.

The sealing member 534 includes an inner sealing part 534a of soft metal and an outer sealing part 534b closely contacting the outer circumference of the inner sealing part 534a. The detailed structure and quality of material of the sealing member 534 are the same as the sealing member 34 in the first embodiment. The receiving groove 524e has a depth d2 equal to or smaller than the thickness t2 of the inner sealing part 534a to closely press the sealing member inserted in the receiving groove 524e.

A circumferential prominence 528d that presses the inner sealing part 534a is formed around the edge of the entrance of the insert portion 528a of the female flange block 528.

Beads 524e-1, 528d-1 having triangular cross sections are circumferentially formed on the bottom inside the receiving groove 524e and on the circumferential prominence 528d to keep air tightness, respectively. The beads 524e-1, 528d-1 may have a circular cross section or a polygonal cross section.

Figure 16:
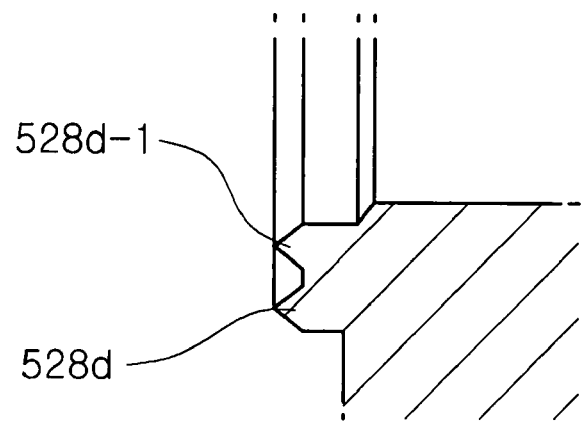
FIG. 16 is a detailed view of the part represented by E of FIG. 15.
Figure 17:
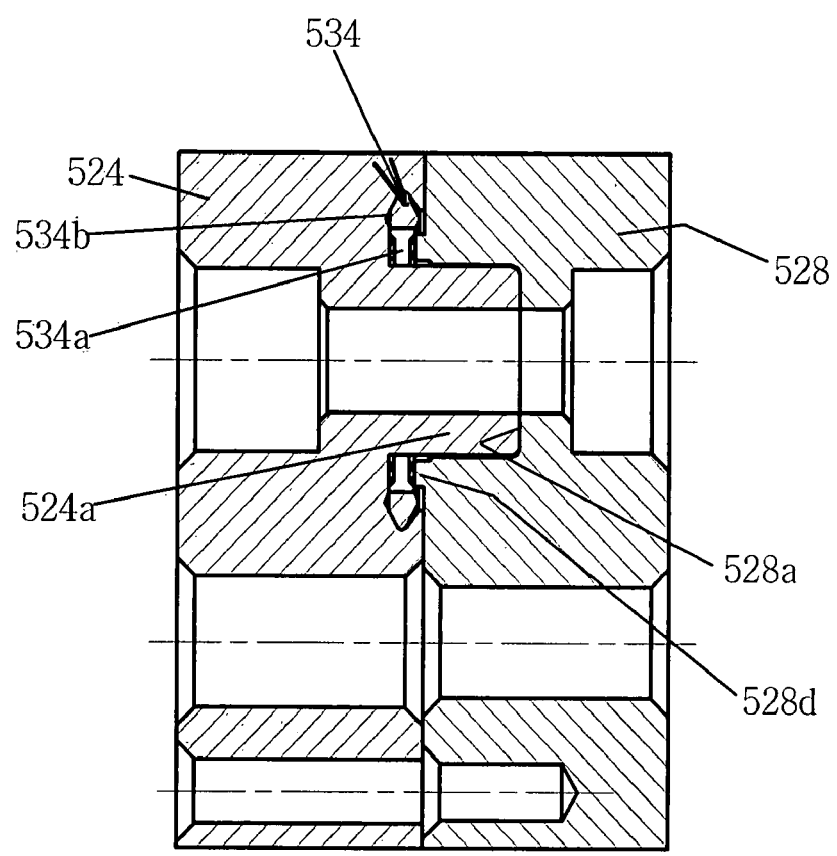
FIG. 17 is an assembly view of FIG. 15.

FIG. 16 is a detailed view for the E-part of FIG. 15 and FIG. 17 is an assembly view of FIG. 15. The other configurations in the second embodiment are the same as in the first embodiment and detailed descriptions for them are not provided.

Figure 18:
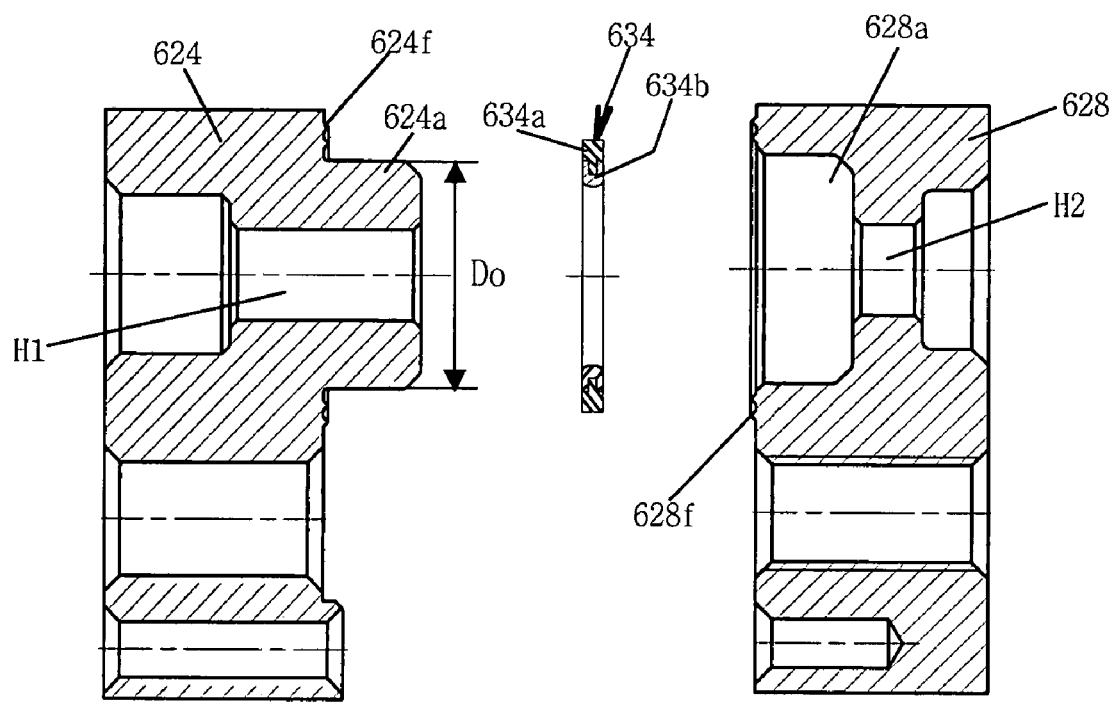
FIG. 18 is a cross-sectional view of a pipe connecting structure for refrigerating cycle system according to a third embodiment of the invention.

FIG. 18 shows a pipe connecting structure according to a third embodiment of the invention. As shown in FIG. 18, a male flange block 624 has a protrusion 624a with a hole H1 communicating to the first pipe (shown in FIG. 4), a female flange block 628 has an insert portion 628a to which the protrusion 624a is inserted, and a sealing member 634 is fitted around the outside of the protrusion 624a.

Figure 19:
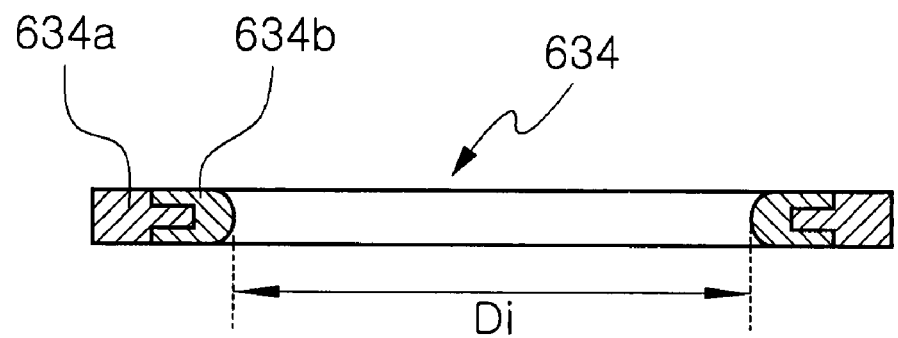
FIG. 19 is a detailed view of the sealing member of FIG. 18.

As shown in FIG. 19, the sealing member 19 includes an outer sealing part 634a of soft metal and an inner sealing part 634b closely contacting the inside of the outer sealing part 634a. The outer sealing part 634a is made of soft metal, such as aluminum, white wax, or tin alloy, and the inner sealing part 634b is made of propylene-based or nitrol-based rubber having high elasticity and air tightness. A prominence and a depression to fit each other are formed on the combining surfaces of the outer sealing part 634a of soft metal and the inner sealing part 634b of rubber to increase the combining force.

The inner diameter Di of the inner sealing part 634b of rubber is set smaller than the outer diameter Do of the protrusion 624a to increase air tightness of the sealing member 634 fitted around the outer circumference of the protrusion 624a.

Beads 628f having a triangular cross section are circumferentially formed around the edge (on the combining surface) of the entrance of the insert portion 628a of the female flange block 628 to keep air tightness by pressing a side of the sealing member 634. Beads 624f having a triangular cross section are formed around the root end (on the combining surface) of the protrusion 624a of the male flange block 624 to keep air tightness by pressing the other side of the sealing member 634. The beads 628f, 624f may have a circular cross section or a polygonal cross section.

Figure 20:
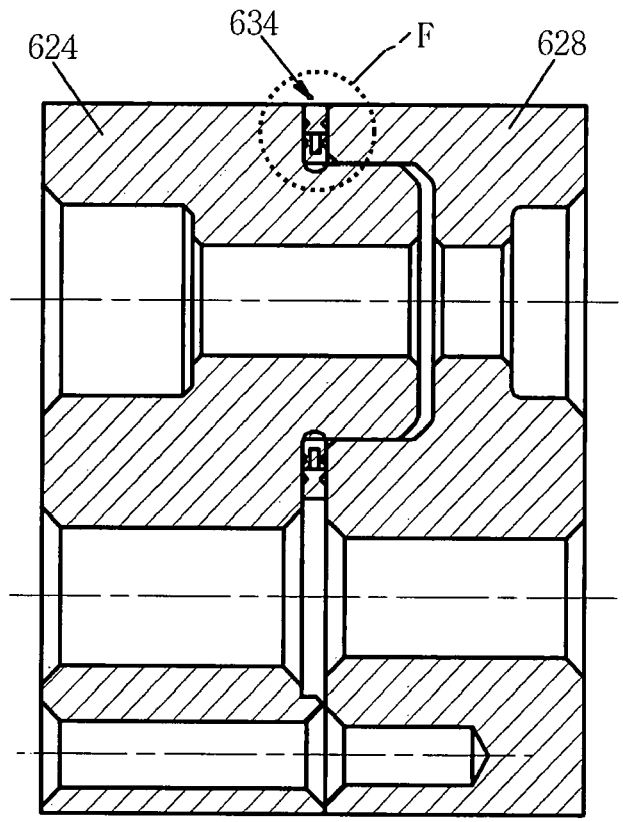
FIG. 20 is an assembly view of FIG. 18.
Figure 21:
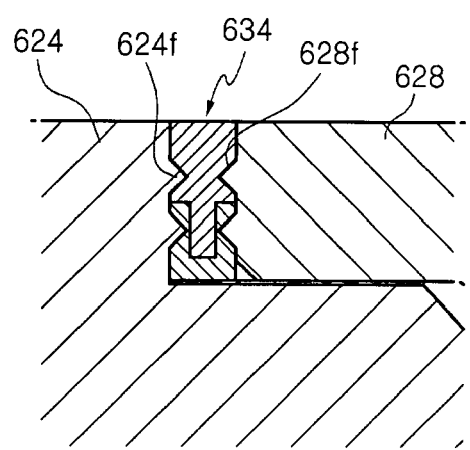
FIG. 21 is a detailed view of the part represented by F of FIG. 20.

FIG. 20 is an assembly view of FIG. 18 and FIG. 21 is a detailed view for F-part of FIG. 20. The other configurations in the third embodiment are the same as in the first embodiment and the detailed descriptions for them are not provided.

Figure 22:
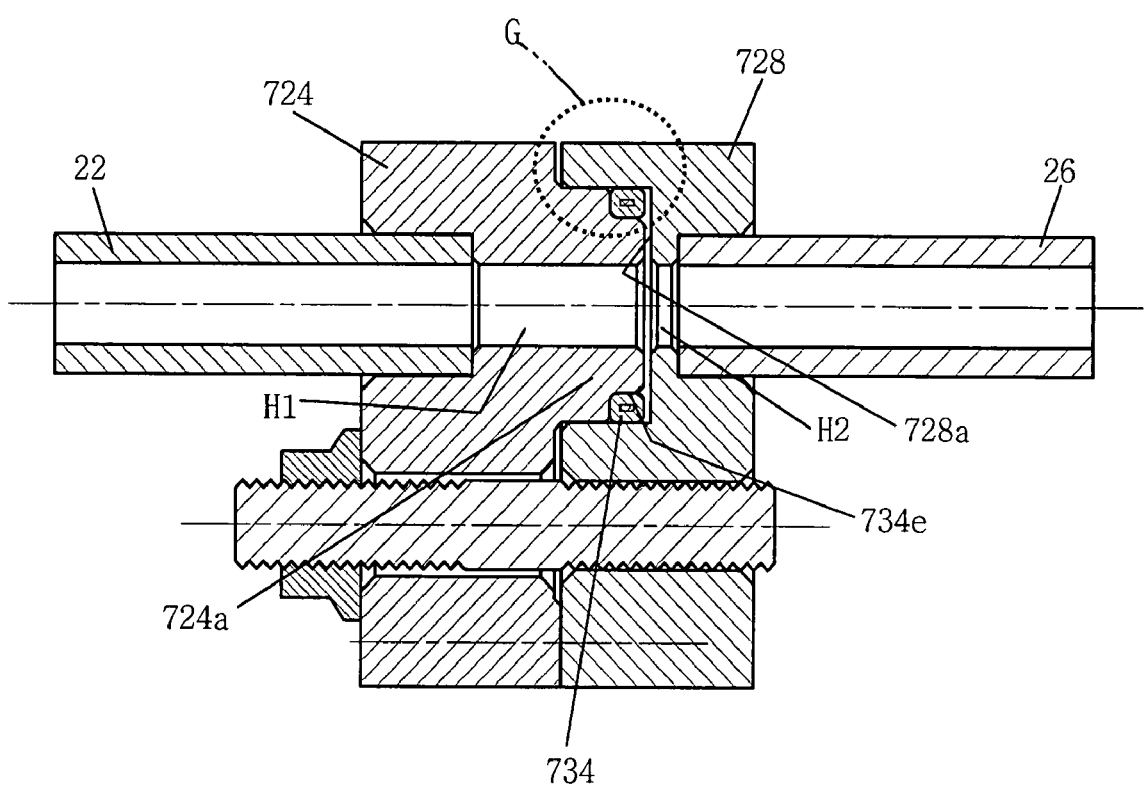
FIG. 22 is an assembly cross-sectional view of a pipe connecting structure for refrigerating cycle system according to a fourth embodiment of the invention.

FIG. 22 shows a pipe connecting structure according to a fourth embodiment of the invention. As shown in FIG. 22, a male flange block 724 has a protrusion 724a with a hole H1 communicating to a first pipe 22, a female flange block 728 has an insert portion 728a to which the protrusion 724a is inserted, and a sealing member 734 is fitted around the outside of the protrusion 724a. A step 734e to seat the received sealing member 734 is formed around the end of the protrusion 734e.

Figure 23:
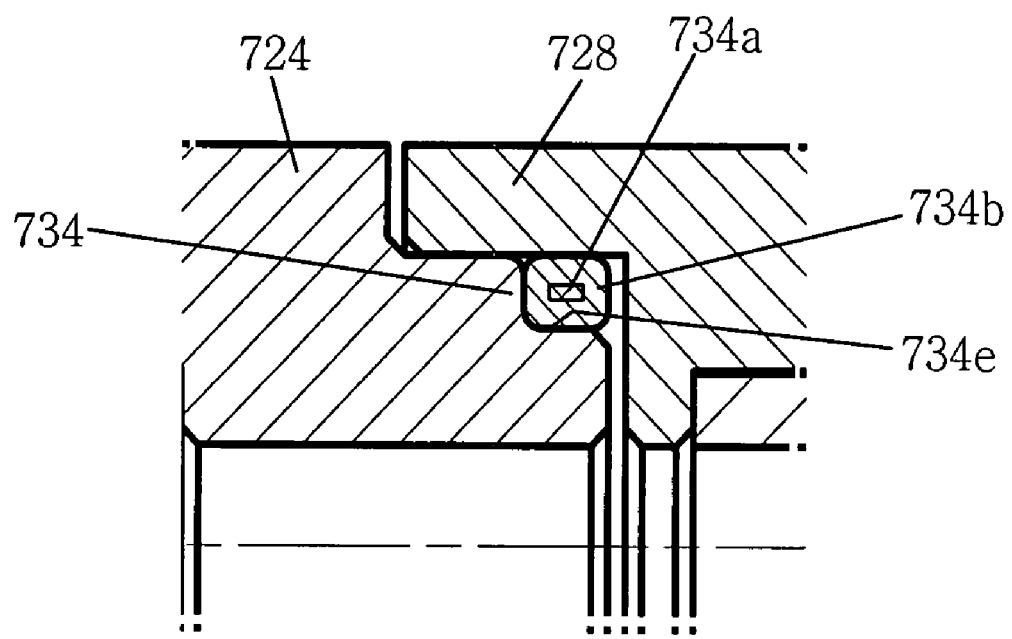
FIG. 23 is a detailed view of the part represented by G of FIG. 22.

As shown in FIG. 23, the sealing member 734 includes an inner sealing part 734a of soft metal and an outer sealing part 734b of rubber entirely wrapping around the outside of the inner sealing part 734a. The inner sealing part 734a is made of soft metal, such as aluminum, white wax, or tin alloy, and the outer sealing part is made of propylene-based or nitrol-based rubber having high elasticity and air tightness.

Figure 24:
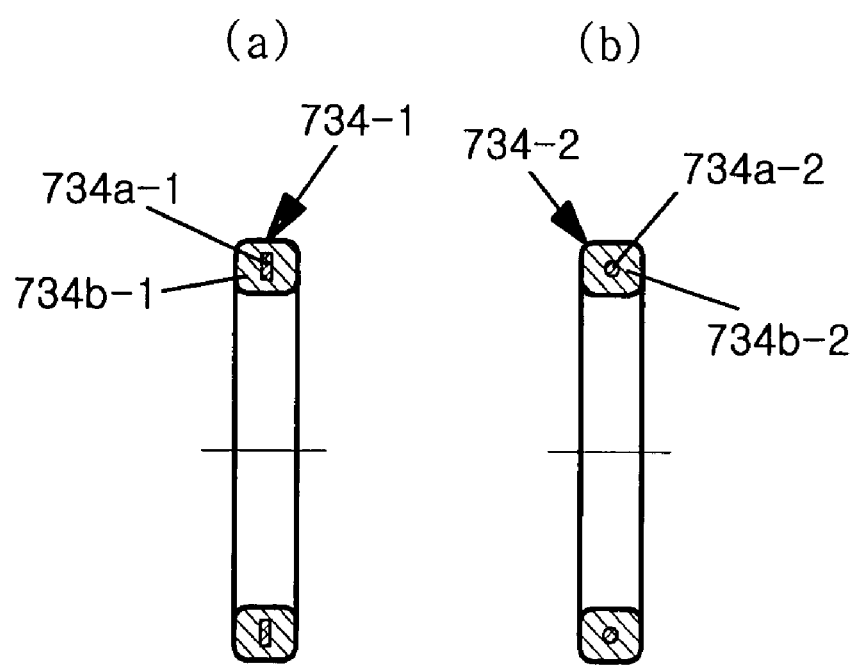
FIGS. 24A and 24B are cross-sectional views showing modifications for the sealing member of FIG. 22.

The inner sealing part 734a according to the present (fourth) embodiment is a ring having the same cross section as a plate that is wide in the thickness direction of the sealing member 734. However, as shown in FIG. 24A, the sealing member 734-1 may include a ring-shaped inner sealing part 734a-1 having the same cross section as a plate that is wide in the width direction of a sealing member 734-1 and an outer sealing part 734b-1 wrapping around the inner sealing 734a-1. Alternatively, as shown in FIG. 24B, the sealing member 734-2 may include a ring-shaped inner sealing part 734a-2 having a circular cross section and an outer sealing part 734b-2 wrapping around the inner sealing part 734a-2. The inner sealing part may be a ring having a variety of cross sections, such as plate, rectangle, polygon, or circle.

The other configurations in the fourth embodiment are the same as in the first embodiment and detailed descriptions for them are not provided.

Figure 25:
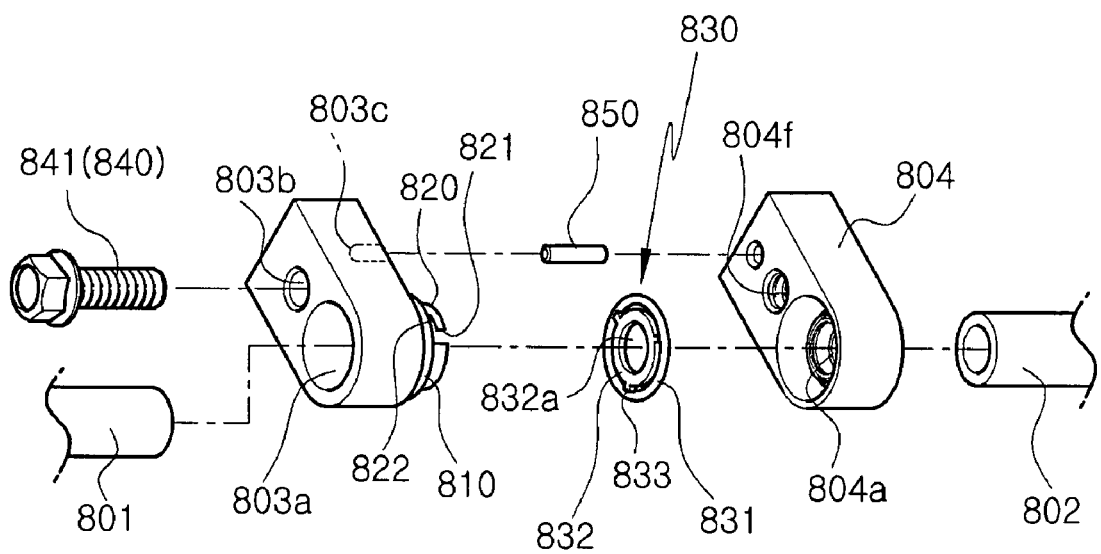
FIG. 25 is a perspective exploded view of a fifth embodiment of the invention.

FIG. 25 shows a pipe connecting structure according to a fifth embodiment of the invention. Referring to FIG. 25, for example, first and second pipes 801, 802 allowing a refrigerant to circulate are connected and arranged by connecting means including a male flange block 803 and a female flange block 804.

Figure 26:
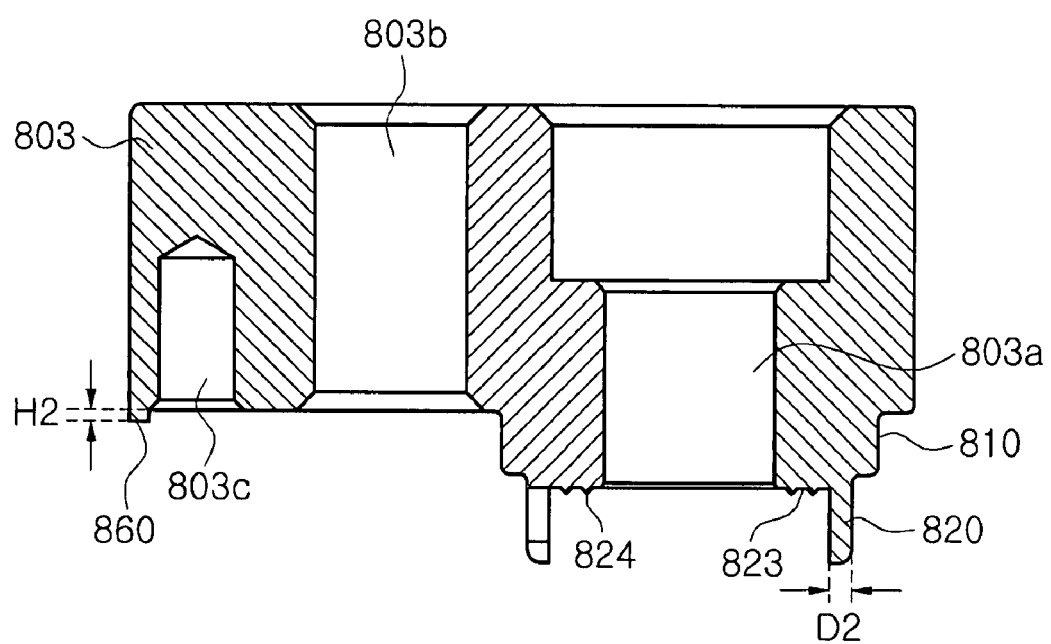
FIG. 26 is a cross-sectional view of a male flange block of the fifth embodiment of the invention.
Figure 27:
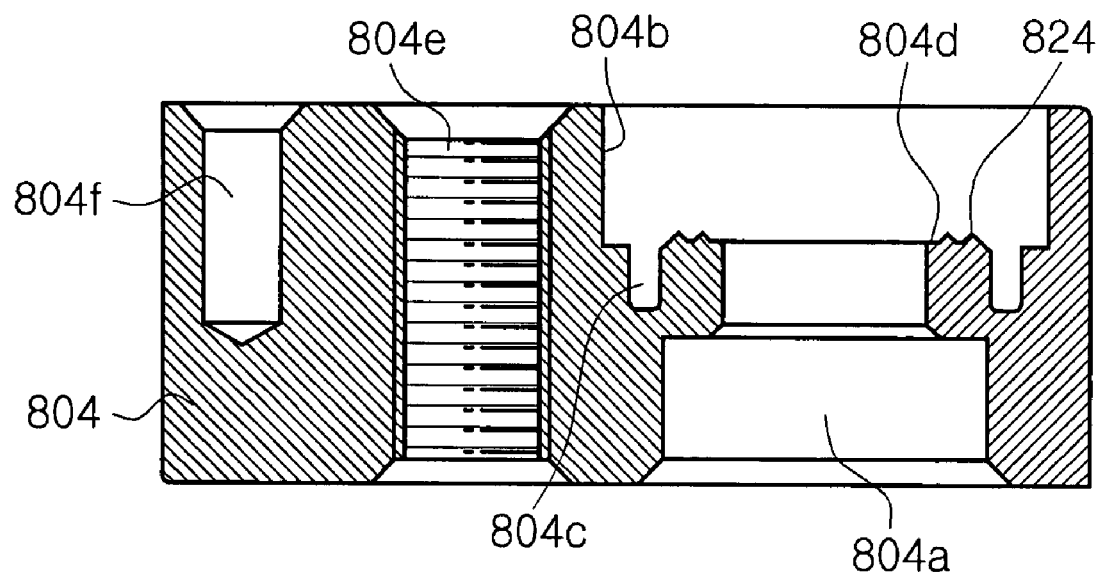
FIG. 27 is a cross-sectional view of a female flange block of the fifth embodiment of the invention.

The male flange block 803 of the connecting means, as shown in FIGS. 25 and 26, has a first pipe-combining hole 803a to fit an end of the first pipe 801 at one side of the male flange block 803 and a first fastening hole 803b to fasten a bolt 841 (described below) at the other side of the male flange block 803.

The male flange block 803 has a first combining protrusion 810 on the combining surface to combine with the female flange block 804. The first combining protrusion 810 protrudes in communication with the first pipe-combining hole 803a.

The first pipe-combining hole 803a is bored at the center of the first-combining protrusion 810 and a second combining protrusion 820 protrudes from the end face of the first combining protrusion 810 at a predetermined interval around the first pipe-combining hole 803a.

A first seating face 823 to seat an inner sealing part 832 of a sealing member 830 (described low) is formed between the second combining protrusion 820 and the first pipe-combining hole 803a.

Sealing beads 824 protrude from the first seating face 823 and allow the inner sealing part 832 of the sealing member 830 to be seated. The sealing beads 824 may be formed in a variety of cross sections such as a triangle, circle, or polygon.

The second combining protrusion 820 has a plurality of vertical combining grooves 821 that is formed perpendicular to the end face at predetermined intervals and a plurality of horizontal combining grooves 822 may be formed in communication with the vertical combining grooves 821 in a predetermined horizontal length at predetermined intervals along the outer circumference of the second combining protrusion 820.

When only the vertical combining grooves 821 are formed through the second combining protrusion 820, the inner diameter of an O-ring 831 of the sealing member 830 is set smaller than the outer diameter of the second combining protrusion 820 to tightly fit, or holding prominences 821a are formed at the end of the second combining protrusion 820 to hold the O-ring 831.

Alternatively, when the vertical combining grooves 821 and the horizontal combining grooves 822 are formed through the second combining protrusion 820, the sealing member 830 is combined with the second combining protrusion 820 by inserting wings 833 (described later) into the vertical grooves 821 and then rotating the O-ring 831 to insert the wings into the horizontal combining grooves 822.

The sealing member 830 is fixedly combined with the second combining protrusion 820 by setting the inner diameter of the O-ring 831 of the sealing member 830 to 0.8 times of the outer diameter of the second combining protrusion 820, in order to use an elasticity of the O-ring 831.

To reinforce the combining force of the sealing member 830, the holding prominences 821a to hold the sealing member 830 protrude radially outside at the end of the second combining protrusion 820 and prevent the sealing member 830 from coming off.

The holding prominences 821a may protrude around the outer circumference at the end of the second combining protrusion 820 at predetermined intervals or may circumferentially protrude, and has a smaller thickness than the thickness t1 of the O-ring 831, so that it maintains the function of the O-ring 831 and prevents separation.

The female flange block 804 is formed in the corresponding shape to the male flange block 803 and has the second pipe-combining hole 804a bored at the position corresponding to the first pipe-combining hole 803a.

In the female flange block 804, a first protrusion-combining hole 804b to insert the first combining protrusion 810 is formed on the combining surface to combine with the male flange block 803, and the first protrusion-combining hole is in communication with the second pipe-combining hole 804a.

The second pipe-combining hole 804a is bored at the center of the first protrusion-combining hole 804b and second protrusion-combining grooves 804c are formed at predetermined intervals around the second pipe-combining hole 804a to insert the end of the second combining protrusion 820.

A second seating face 804d to seat a side of the inner sealing part 832 of the sealing member 830 is formed between the second protrusion-combining groove 804c and the second pipe-combining hole 804a and sealing beads 824 are formed on the second seating face 804d.

The female flange block 804 has a second fastening hole 804e corresponding to a first fastening hole 803b and is combined with the male flange block by a fastening bolt 841 through the first and second fastening holes 803b, 804e.

The first fastening hole 803b or the second fastening hole 804e have a thread inside, respectively, to fasten the bolt.

Pin holes 803c, 804f are respectively formed on the combining surfaces of the male flange block 803 and the female flange block 804 to combine the blocks by inserting a fixing pin 850.

The fixing pin 850 guides the combining position of the male flange block 803 and the female flange block 804 so as to combine them at an accurate position.

Figure 28:
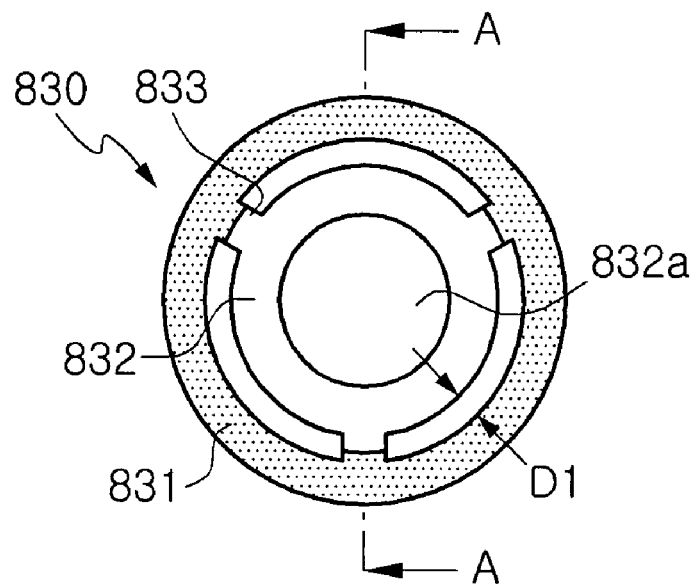
FIG. 28 is a front view of a sealing member of the fifth embodiment of the invention.
Figure 29:
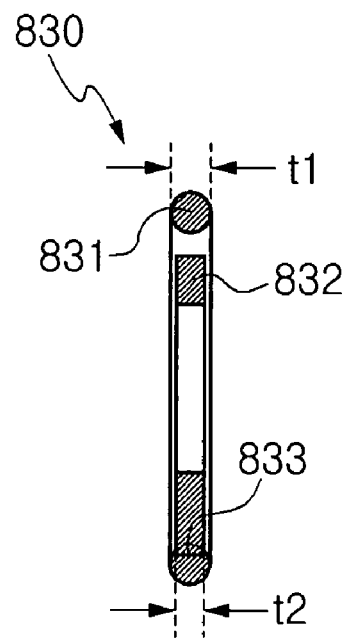
FIG. 29 is a cross-sectional view showing the shape of the sealing member taken along a line A-A' of FIG. 28.
Figure 30:
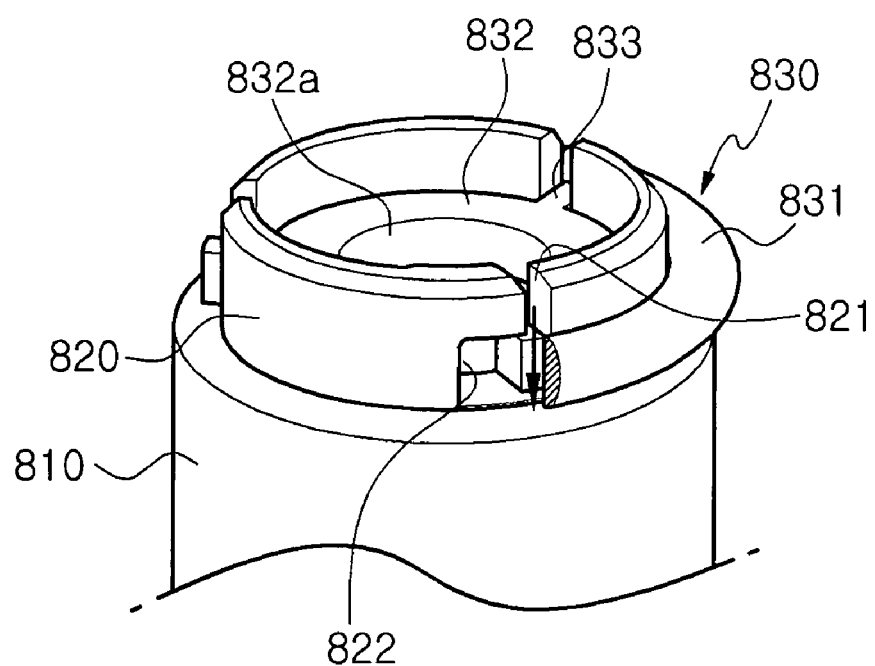
FIG. 30 is a perspective expanded view showing main parts of the fifth embodiment of the invention.
Figure 31:
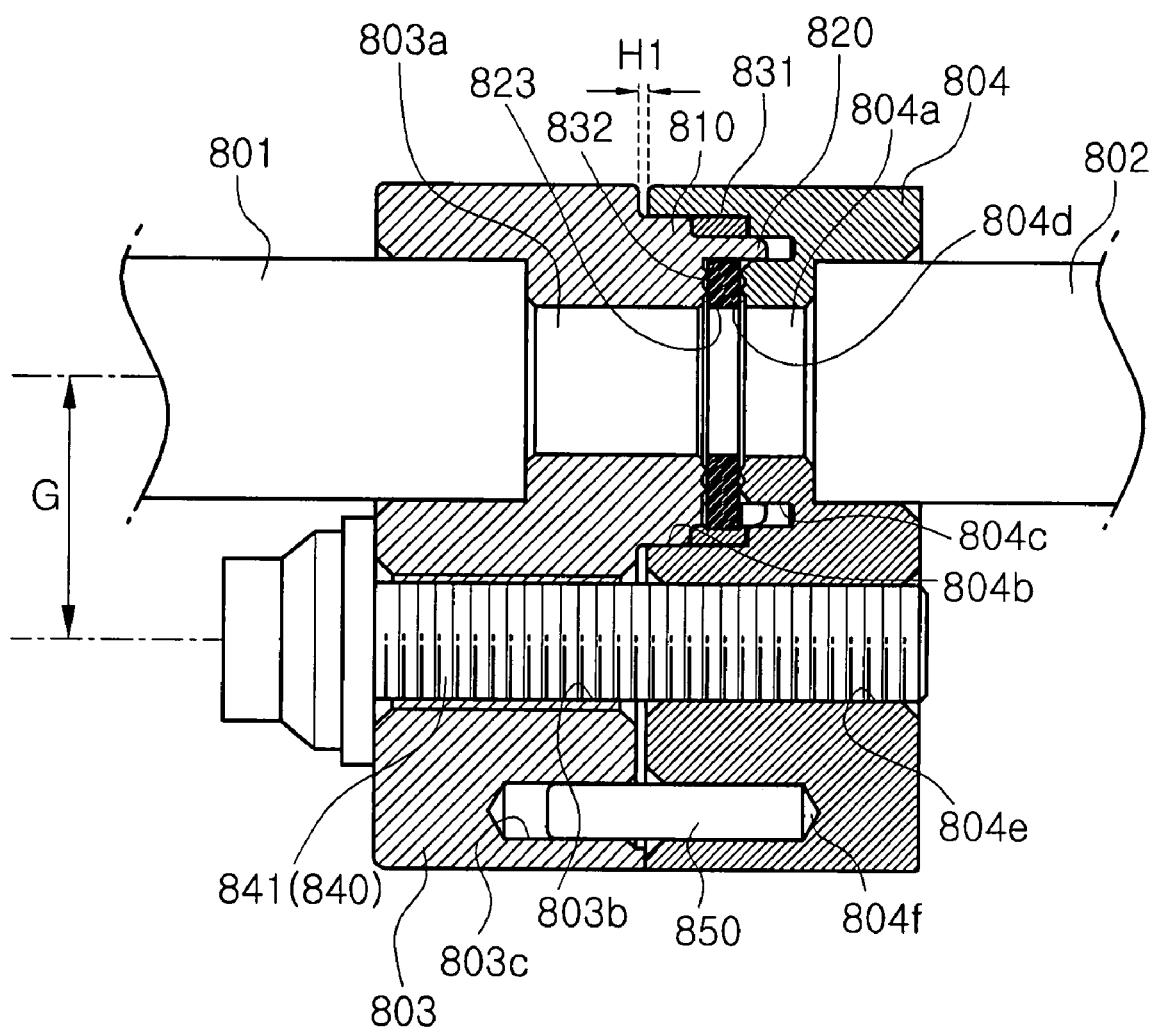
FIG. 31 is a cross-sectional view illustrating the combination of the pipe connecting structure in use of the fifth embodiment of the invention.
Figure 32:
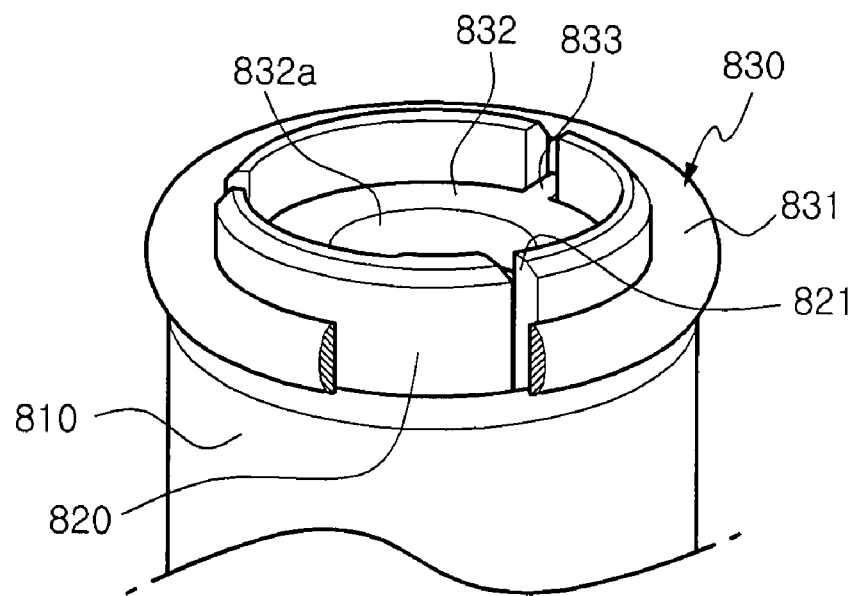
FIG. 32 is a perspective expanded view of main parts of the fifth embodiment of the invention.
Figure 33:
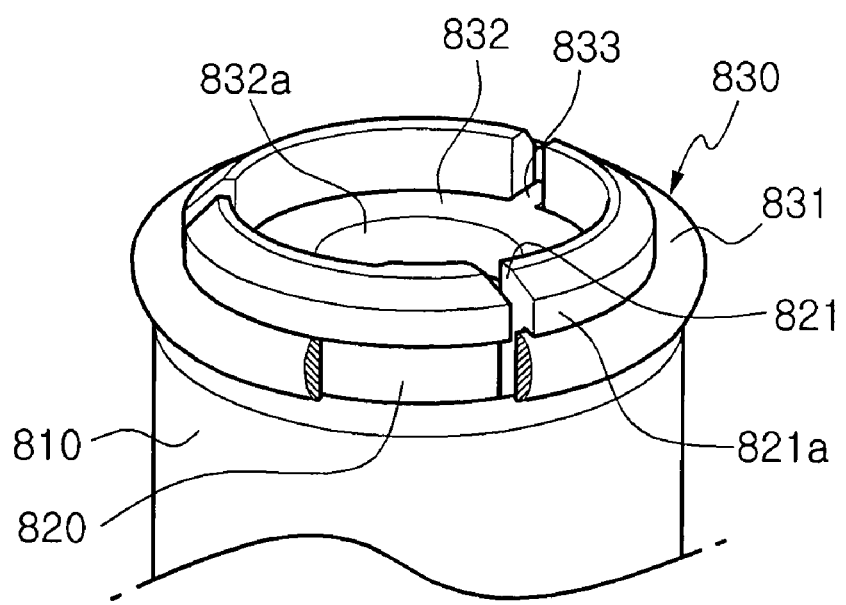
FIG. 33 is a perspective expanded view of main parts of the fifth embodiment of the invention.

The sealing member 830 is fitted around the second combining protrusion 820, and the sealing member 830, as shown in FIGS. 28 and 29, includes the O-ring 831 surrounding the outside of the second combining protrusion 820 for sealing and the inner sealing part 832 having a through hole 832a communicating with the first and second pipe-combining holes 803a, 804a. The inner sealing part 832 is provided inside the O-ring 831 and seated on the first seating face 823 inside the second combining protrusion 820.

In the sealing member 830, the O-ring 831 and inner sealing part 832 may be integrally formed. The wings 833, which protrude at predetermined intervals along the outer circumference of the inner sealing part 832 and maintain the space between the inner sealing part 832 and the O-ring 831 with the ends of the wings fixed to the inside of the O-ring 831, may be formed.

The O-ring 831 has a circular ring shape having an inner diameter not larger than the outer diameter of the second combining protrusion 820 and is fitted around the outside of the second combining protrusion 820.

The O-ring 831 is made of rubber of synthetic rubber, preferably ethylene-base rubber (EPDN), fluorine-based rubber (FKM), or nitrol-based rubber (H-NBR) having high cold resistance and air tightness.

The inner sealing part 832 has a circular plate shape with a through hole 832a at the center and is fixed to the inside the O-ring 831 such that spaces D1 to fit the second combining protrusion 820 are formed between the outside of the inner sealing part 832 and the inside of the O-ring 831.

The inner sealing part 832 is made of soft metal, such as tin alloy, soft aluminum, white wax, or fluorine resin, or Teflon-series resin.

In detail, the inner sealing part 832 is made of a softer material than the male flange block 803 or the female flange block 804. If the same material is used, the inner sealing part 832 may be given different hardness through heat treatment and change of process, or it may be made of a resin.

The inner sealing part 832 has wings 833 integrally protruding from the outer circumference at predetermined intervals and the wings 833 are fixedly inserted in the O-ring.

Parts of the outside of the wings 833 are covered by the O-ring 831 to reinforce the combining force.

The number of the wings 833 depends on the number of the vertical combining grooves 821 in the second combining protrusion 820, and have the width and thickness capable of being inserted in and combined with the vertical combining grooves 821 and horizontal combining grooves 822.

The space D1 between the O-ring 831 and the inner sealing part 832 is set in 1 to 2 times thicker than the thickness D2 of the second combining protrusion 820 to facilitate to fit the second combining protrusion 820 into the sealing member 830 without deteriorating the air tightness.

Figure 35:
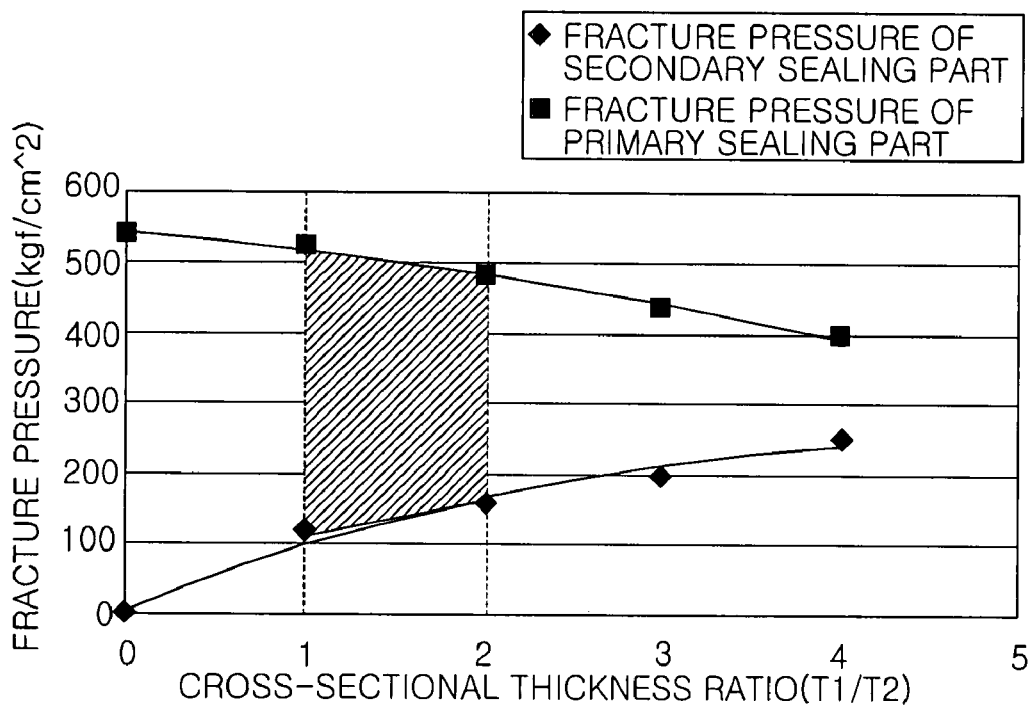
FIG. 35 is a graph showing a cross-sectional thickness ratio of a sealing member to fracture pressure.

FIG. 35 shows the most suitable cross-sectional thickness ratio t1/t2 to a fracture pressure.

As shown in FIG. 35, the O-ring 831 preferably has a thickness t1 1.0 to 2.0 times of the thickness t2 of the inner sealing part 832, which allows main sealing by the inner sealing part 832 and secondary sealing by pressing the O-ring to be uniform. As the cross-sectional thickness t1 of the O-ring increases, the secondary sealing effect increases, while it adversely affects the function of the main sealing part (i.e. the inner sealing part 832), assembling and the structure. Further, as the cross-sectional thickness t1 of the O-ring decreases, the main sealing is improved, but the secondary sealing deteriorates. As a result, the inner sealing part may corrode due to corrosive materials permeating from the outside.

Further, the cross-sectional thickness ratio t1/t2 affects the assembling and the flange size of the male and female flange blocks. Accordingly, as the cross-sectional thickness ratio increases (t1>t2), the assembling becomes difficult and the male flange block should be increased in size.

On the other hand, fastening means 840 to fasten the male flange block 803 and the female flange block 804 is a bolt 841 that is threaded-fastened in the first and second fastening holes 803b, 804e.

Returning to FIG. 26, a step 860 protrudes from one side end on the combining surface of the male flange block 803 to reinforce the combining force of the bolt 841 so that it serves as a lever to uniformly transmit the combining force of the bolt 841.

It is preferable to assemble the male flange block 803 and female flange block 804 such that a space H1 smaller than the height H2 of the step 860 is formed therebetween.

The height H2 of the step 860 depends on a bolt-fastening distance G between the centers of the pipes and bolt 841.

Figure 36:
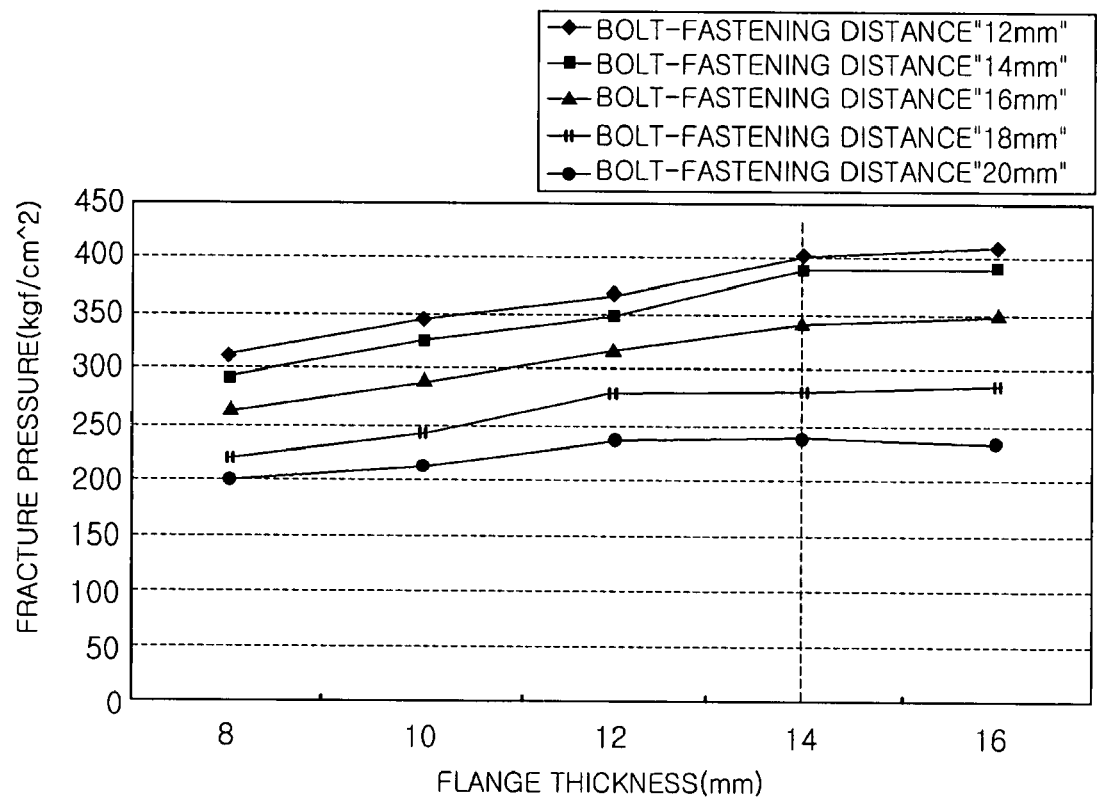
FIG. 36 is a graph showing fracture pressure for each bolt-fastening distance G for comparison, of the fifth embodiment of the invention.

The bolt-fastening distance G of the bolt 841, as shown in FIG. 36, preferably ranges from 13 mm to 16 mm. As the distance becomes larger, the intensity of the fracture pressure is rapidly decreased.

Figure 37:
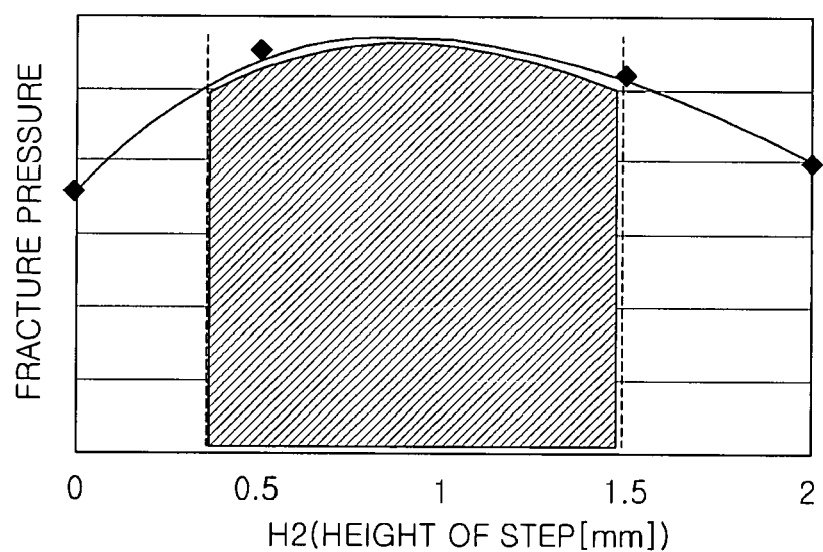
FIG. 37 is a graph showing changes in fracture pressure to changes in the height H2 of the step of the fifth embodiment of the invention.

As shown in FIG. 37, it is preferable to basically set the height H2 of the step 860 in the range of 0.3 to 1.5 mm where the intensity of the fracture pressure is highest.

The less the bolt-fastening distance G, the higher the fracture pressure, and when the step 860 is excessively high, the fracture pressure decreases.

The step 860 uniformly transmits the fastening force of the bolt 841 by serving as a lever in assembling the male flange block 803 and female flange block 804, and maintains the fastening force such that it prevents a high-pressured refrigerant flowing from leaking out due to decrease of the fastening force and bears high pressures.

The assembly of the male flange block 803 and the female flange block 804 having the configurations as described above is now described in detail below.

The first and second pipes 801, 802 are inserted into the first and second pipe-combining holes 803a, 804a of the male flange block 803 and the female flange block 804, respectively, and then fixed in the first and second pipe-combining holes 803a, 804a by welding or brazing.

When the sealing member 830 is combined with the second combining-protrusion 820 by inserting the wings 833 into the vertical combining grooves 821, the O-ring 831 combines with outside of the second combining protrusion 820 and the inner sealing part 832 combines with inside the second combining protrusion 820.

The sealing member 830 is fixedly combined with the second combining-protrusion 820 by inserting the wings 833 in the vertical grooves 821 and then rotating it to insert the wings 833 into the horizontal combining-grooves 822.

In other words, the sealing member 830 is fixedly combined with the second combining-protrusion 820 by fitting the second combining-protrusion 820 into the spaces between the O-ring 831 and the inner sealing part 832.

Since the inner sealing part 832 is made of a resin or soft metal with a predetermined rigidity, the sealing member 830 primarily seals the joint against the refrigerant flowing through the first and second pipe holes 803a, 804a under high pressure of the refrigerant. Further, the O-ring 831 surrounds the outside of the second combining-protrusion 820 to carry out secondary sealing.

When the sealing member 830 is combined with the second combining-protrusion 820 and seated on the first seating face 823, a bead mark is left on the inner sealing part 832 by the sealing beads 824, so that the bead mark should be accurately positioned on the sealing beads 824 to keep air tightness in reassembling.

The bead mark allows accurate location for reassembling the sealing member 830, and the workability in reassembling and air tightness after reassembling to be maintained.

After being combined with the sealing member 830 as described above, the second combining-protrusion 820 is inserted into the second protrusion-combining groove 804c while the first combining protrusion 810 is inserted into the first combining hole 804b, so that the male flange block 803 and female flange block 804 is combined.

The fixing pin 850 that is inserted into the pin holes 803c, 804f of the male flange block 803 and the female flange block 804 guides the combining position of the blocks to facilitate a combining work.

As described above, after the male flange block 803 is combined with the female flange block 804, the first and second pipes 801, 802 are completely connected by threaded-fastening the bolt 841 into the first and second fastening holes 803b, 804e. Because the fastening force uniformly acts on the male flange block 803 and female flange block 804, the pipe connecting structure comes to have durability and air tightness under high pressures.

Figure 34:
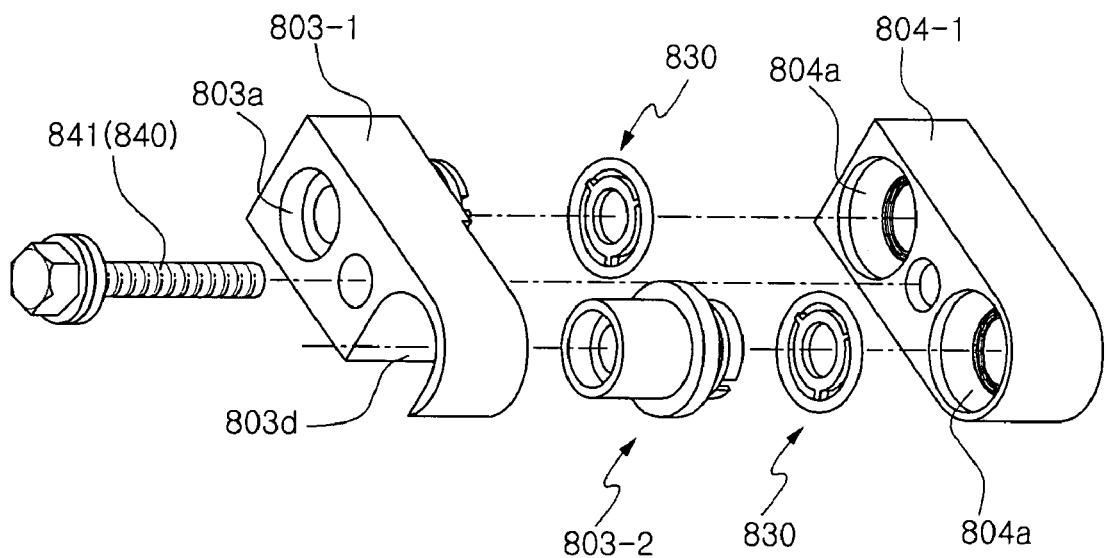
FIG. 34 is a perspective exploded view of composite connecting blocks of the fifth embodiment of the invention.

On the other hand, as shown in FIG. 34, the pipe connecting structure may have two male flange blocks, a female flange block, a sealing member, and fastening means.

According to the above configuration, a sub-male flange block 803-2 is seated on a groove 803d of a male flange block 803-1, a female flange block 804-1 is connected with the male flange block 803-1, pipes are connected, and then they are fastened by a bolt 841.

Figure 38:
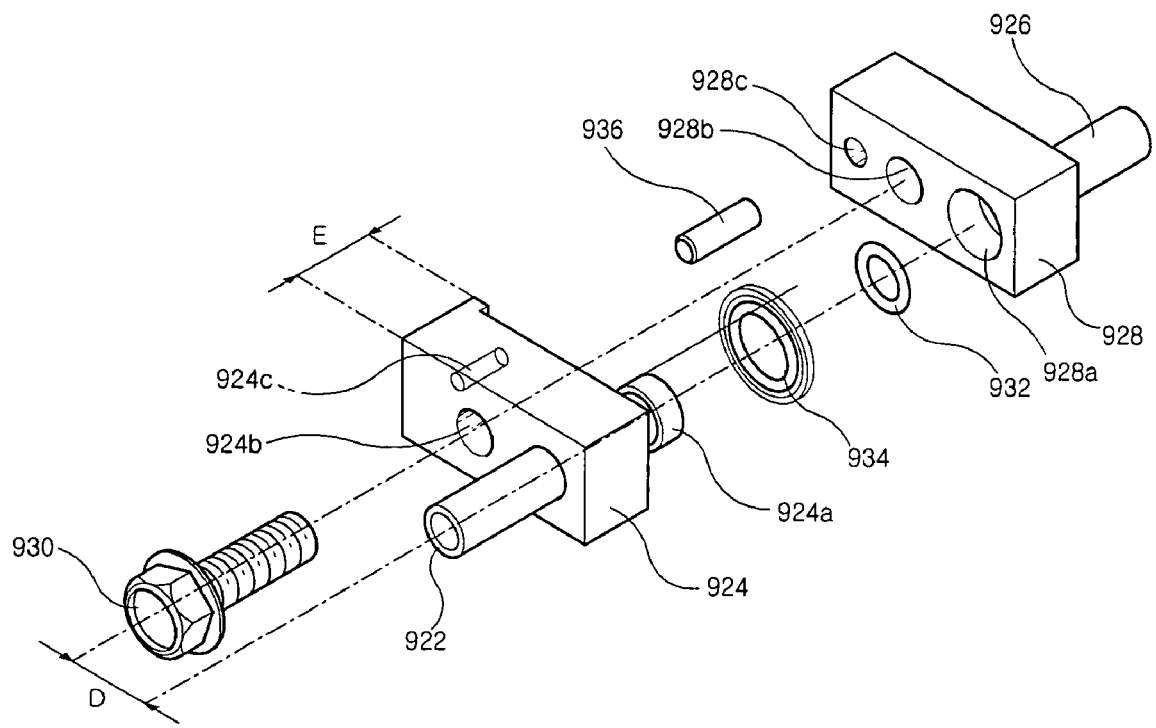
FIG. 38 is a perspective exploded view of a pipe connecting structure for a refrigerating cycle system according to a sixth embodiment of the invention.
Figure 39:
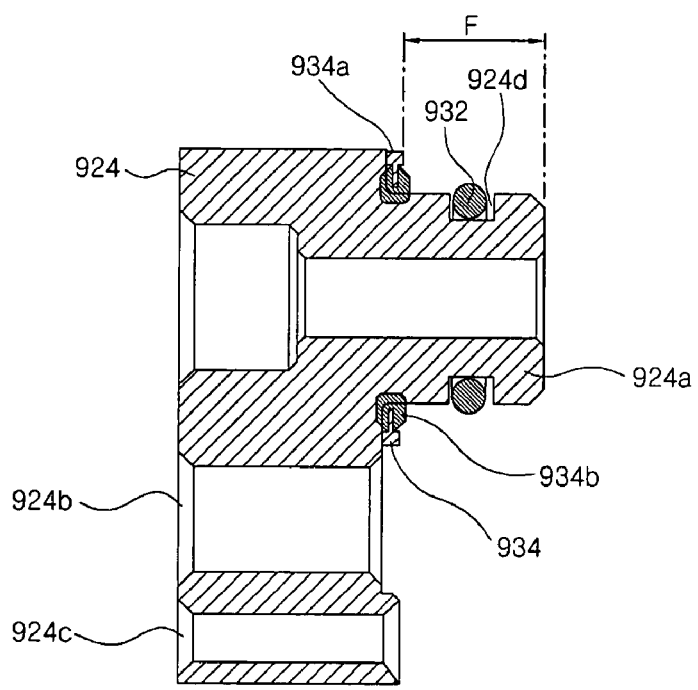
FIG. 39 is a cross-sectional view the male flange block of FIG. 38 with a sealer assembled at the protrusion.

FIGS. 38 and 39 show a sixth embodiment of the invention. Referring to FIGS. 38 and 39, a rectangular shaped male flange block 924 connected with a first pipe 922 and a rectangular shaped female flange block 928 connected with a second pipe 926 are fastened by a bolt 930.

The male flange block 924 has a protrusion 924a having a hole that communicates with the first pipe 922 and the female flange block 928 has an insert portion 928a to which the protrusion 924a is inserted. A primary sealer 932 is provided at the middle outside the protrusion 924a for primary sealing and a secondary sealer 934 is provided at the root end of the protrusion 924a for secondary sealing. A fixing pin 936 is inserted into the male flange block 924 and the female flange block 928 so that the protrusion 924a is accurately inserted into the insert portion 928a. The second pipe 926 communicates with the insert portion 928a.

The bolt 930 is fixedly inserted in a hole 928b of the female flange block 928 via a through hole 924b of the male flange block 924. Holes 924c, 928c to fit the fixing pin 936 are respectively formed through the male flange block 924 and the female flange block 928.

The primary sealer 932 is a rubber ring that bears high temperatures of a $CO_2$ refrigerant and compressor oil and fitted in a circumferential groove 924d formed at the middle outside the protrusion 924a. The secondary sealer 934 is an integral ring with a metal sealing part 934a and a rubber sealing part 934b fitted inside the metal sealing part 934a. The portion of the male flange block 924 where the hole 924c to insert the fixing pin is formed protrudes to the same level with the thickness of the metal sealing part 934a of the secondary sealer 934 and closely contacts with the combining surface of the female flange block 928. FIG. 39 shows the rubber sealing part 934b of the secondary sealer 934 that is not closely pressed yet by assembling.

The rubber sealing part 934b is made of rubber with high cold resistance against low temperatures, flexibility, and air tightness. The metal sealing part 934a prevents the rubber sealing part 934b from deforming. The rubber sealing part 934b is 1.05 to 2 times thicker than the metal sealing part 934a to keep air tightness by close-pressing.

In FIGS. 38 and 39, a reference character D represents the distance between the centers of the protrusion 924a and the bolt 930 (hereafter, called 'bolt-fastening distance'), E represents the thickness of the male flange block 924 (including the thickness of the secondary sealer), and F represents the protruding length of the protrusion 924a (except for the thickness of the secondary sealer).

The male flange block 924 and female flange block 928 are rectangular shaped blocks. Therefore, when the combining areas are the same, the fracture pressure reaches the maximum. The double sealing structure having the primary sealer 932 and the secondary sealer 934 minimizes leakage and increases the fracture pressure, and the fixing pin 936 allows accurate insertion of the protrusion 924a of the male flange block 924 with the primary and secondary sealers 932, 934 into the insert portion 928a of the female flange block 928 to uniformly distribute pressure to the primary and secondary sealers, to thereby increase air tightness.

The pipe connecting structure according to the embodiment of the invention changes in the fracture pressure according to the thickness of the male flange block, the bolt-fastening distance, the distance between centers of the protrusion and bolt, the protruding length of the protrusion of the male flange block (inserting depth in the insert portion), and the fastening torque of the bolt.

Figure 40:
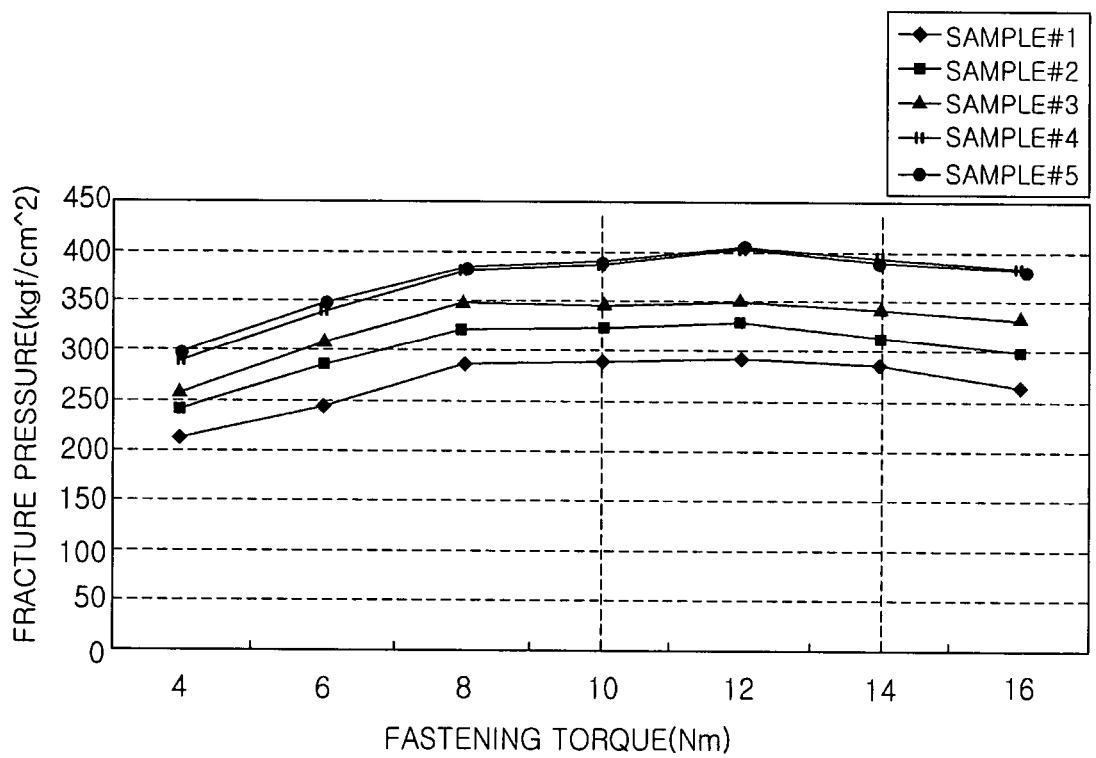
FIG. 40 is a graph showing fracture pressure to bolt-fastening torque in the pipe connecting structure according to the sixth embodiment of the invention.

FIG. 40 shows a graph for changes in the fracture pressure to the fastening torque of the bolt for samples of pipe connecting structures according to the invention, where fastening torque of 4 Nm, 6 Nm, 8 Nm, 10 Nm, 12 Nm, 14 Nm, 16 Nm was applied to the samples having male flange block thicknesses E of 8 mm (sample 1), 10 mm (sample 2), 12 mm (sample 3), 14 mm (sample 4), and 16 mm (sample 5), respectively. As shown in FIG. 40, it can be seen that a stagnant section where the fracture pressure stops increasing appears from 8 Nm to 12 Nm fastening torque, which implies that even though the thickness of the male flange block continuously increases, the fracture pressure does not increase at above a specific torque. In other words, suitable assembling torque exists for the thicknesses of the male flange block.

Considering the result in the graph, it is preferable to set the fastening torque within 10 to 14 Nm for the embodiment.

Figure 41:
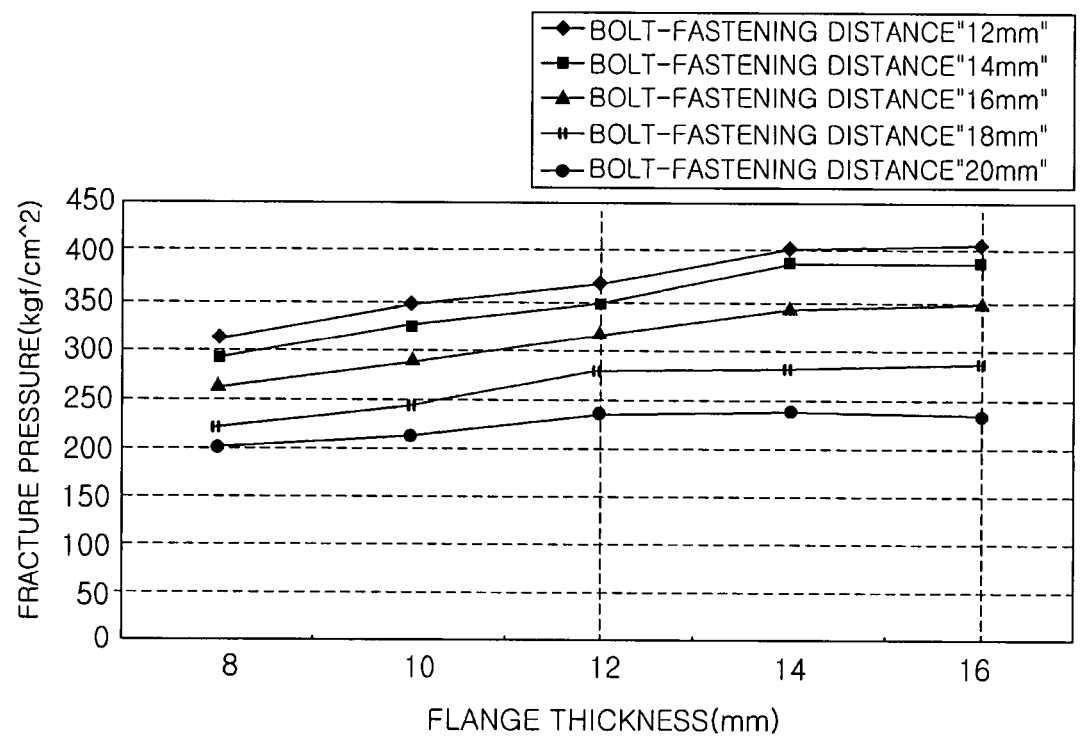
FIG. 41 is a graph showing fracture pressure to the thickness of the male flange block and bolt-fastening distances in the pipe connecting structure according to the sixth embodiment of the invention.

FIG. 41 shows a graph for changes in the fracture pressure when 10 Nm fastening torque was applied, for each sample, where the male flange block thicknesses E of 8 mm, 10 mm, 12 mm, 14 mm, and 16 mm were given to the samples and the bolt-fastening distances D of 12 mm, 14 mm, 16 mm, 18 mm, and 20 mm were given to each of the samples. As shown in the graph, the maximum fracture pressure appears at 12 mm bolt-fastening distance, and it can be seen that as the bolt-fastening distance decreases, the fracture pressure increases.

Considering the result from the graph, it is preferable to set the thickness of the male flange block and the bolt-fastening distance within 12 to 16 mm for the embodiment.

Figure 42:
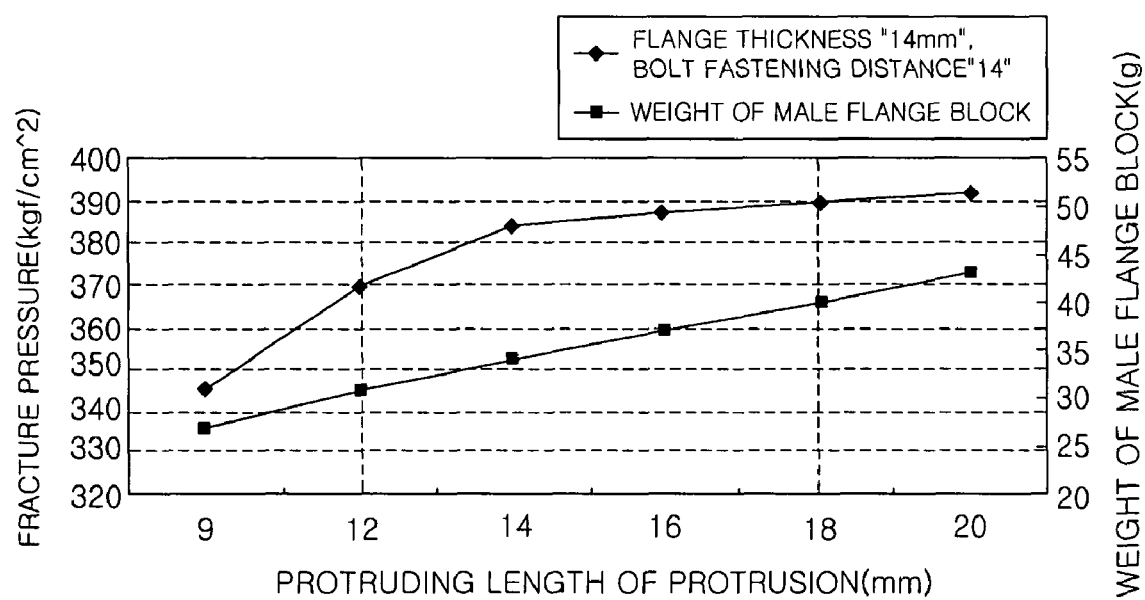
FIG. 42 is a graph showing fracture pressure to the protrusion length of the protrusion of the male flange block in the pipe connecting structure according to the sixth embodiment.

FIG. 42 shows a graph for changes in the fracture pressure, where samples having the protruding length F of the protrusion of the male flange block of 9 mm, 12 mm, 14 mm, 16 mm, 18 mm, and 20 mm were provided, and the thickness of the male flange block of 14 mm and the bolt-fastening distance of 14 mm were given to each of the samples. As seen from the graph, the fracture pressure rapidly increases at the protruding length of the protrusion of the male flange block from 9 mm to 14 mm and a gentle fracture curve appears in the section from 14 mm to 20 mm. The result seen from the graph implies that even though the protruding length of the protrusion of the male flange block continuously increases, the fracture pressure does not increase at above a specific protruding length.

Because the weight increases according to increase of the protruding length, a suitable extent in increase of the protruding length for the increasing amount of the fracture pressure exists.

Considering the result from the graph, it is preferable to set the protruding length of the protrusion of the male flange block in the embodiment within 12 to 18 mm for a double sealing structure, but it may be reduced for an integral sealing member of metal and rubber.

According to a pipe connecting structure of the invention, when pipes, a heat exchanger and a pipe, or two members are connected in a refrigerating cycle system using a $CO_2$ refrigerant, the connecting structure can bear high pressures, air tightness can be maintained under low and high temperatures without changes in quality and shape of sealing members, and it is possible to prevent and minimize leakage of the refrigerant by preventing permeation of $CO_2$.

Further, it is easy to assemble and reassemble a male flange block, female flange block, and sealing member, and thus, convenience and efficiency in application is improved. Particularly, durability and air tightness can be maintained in reassembling.

Further, thickness of a male flange block, a bolt-fastening distance, a fastening torque, and a protruding length of a protrusion can be optimized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pipe connecting structure for a refrigerating cycle system, comprising:
   first and second pipes that are connected and arranged to allow a refrigerant to circulate in the refrigerating cycle; and
   connecting means that connects the first pipe to a second pipe,
   wherein the connecting means includes:
   a male flange block that includes a first pipe-combining hole to which the first pipe is fitted;
   a first combining protrusion that protrudes from a surface of the male flange block in communication with the first pipe-combining hole;
   a second combining protrusion that protrudes from the end face of the first combining protrusion and includes a first seating face inside the second combining protrusion;
   a sealing member that is fitted around the outside of the second combining protrusion and seated in the first seating face inside the second combining protrusion;
   a female flange block that includes a second pipe-combining hole bored from one side to insert the second pipe, a first protrusion-combining hole bored from the other side in communication with the second pipe-combining hole to insert the first combining protrusion, a second protrusion-combining groove formed around the edge inside the first protrusion-combining hole to insert the second combining protrusion, and a second seating face formed inside along the second protrusion-combining groove to seat a side of the sealing member; and
   fastening means that fastens the male flange block to the female flange block.

2. The pipe connecting structure as set forth in claim 1, wherein the second combining protrusion includes vertical combining grooves that are formed perpendicular to the end face of the second combining protrusion.

3. The pipe connecting structure as set forth in claim 2, wherein the second combining protrusion has a plurality of horizontal combining grooves that are formed in communication with the vertical combining grooves in a predetermined horizontal length at predetermined intervals along the outer circumference of the second combining protrusion.

4. The pipe connecting structure as set forth in claim 2, wherein the second combining protrusion has the vertical combining grooves that are formed perpendicular to the end face at predetermined intervals along the outer circumference of the second combining protrusion and holding prominences that protrude outside at the end of the outer circumference of the second combining protrusion.

5. The pipe connecting structure as set forth in claim 1, wherein sealing beads protrude from the first seating face or the second seating face.

6. The pipe connecting structure as set forth in claim 1, wherein the sealing member includes an O-ring surrounding the outside of the second combining protrusion for sealing, and an inner sealing part that includes a through hole communicating with the first and second pipe-combining holes and seated on the first seating face inside the second combining protrusion.

7. The pipe connecting structure as set forth in claim 6, wherein the O-ring and the inner sealing part are integrally formed.

8. The pipe connecting structure as set forth in claim 7, further comprising:
> a plurality of wings that protrude at predetermined intervals along the outer circumference of the inner sealing part and that have the ends fixed to the O-ring to maintain the space between the inner sealing part and the O-ring.

9. The pipe connecting structure as set forth in claim 7, wherein the ends of the wings are fixedly inserted in the O-ring and parts of the outside of the ends are covered by the O-ring.

10. The pipe connecting structure as set forth in claim 6, wherein the O-ring has a cross-sectional thickness t1 in the range of 1.0 to 2.0 times more than the thickness t2 of the inner sealing part.

11. The pipe connecting structure as set forth in claim 6, wherein a space D1 between the O-ring and the inner sealing part is set to have 1 to 2 times more than a thickness D2 of the second combining protrusion.

12. The pipe connecting structure as set forth in claim 6, wherein the O-ring is made of ethylene-base rubber (EPDN), fluorine-based rubber (FKM), or nitrol-based rubber (H-NBR).

13. The pipe connecting structure as set forth in claim 6, wherein the inner sealing part is made of a softer material than the male flange block or the female flange block, or the inner sealing part is given different hardness due to heat treatment and change of process when the inner sealing part is made of the same material as the male or female flange block, or made of a resin.

14. The pipe connecting structure as set forth in claim 1, wherein a step protrudes from a side end of the male flange block.

15. The pipe connecting structure as set forth in claim 14, wherein the male flange block is combined with the female flange block with a space H1 smaller than the height H2 of the step.

16. The pipe connecting structure as set forth in claim 14, wherein the height H2 of the step ranges from 0.3 to 1.5 mm and the bolt-fastening distance G, i.e. the distance between the centers of the pipes and the bolt ranges from 13 mm to 16 mm.

17. The pipe connecting structure as set forth in claim 1, wherein the sealing member includes an O-ring surrounding an outside of the second combining protrusion for sealing, wherein the second combining protrusion has holding prominences that protrude outside at an end of an outer circumference of the second combining protrusion, and wherein the holding prominences protrude from the end of the second combining protrusion less than the thickness of the O-ring.

* * * * *